United States Patent [19]

Rosar et al.

[11] 4,034,063
[45] *July 5, 1977

[54] PROCESS FOR CONTROL OF $SO_x$ EMISSIONS FROM COPPER SMELTER OPERATIONS

[75] Inventors: Edward C. Rosar, Lakewood, Colo.; Jacques M. Dulin, Libertyville, Ill.; Joseph M. Genco, Gahanna; Harvey S. Rosenberg, Columbus, both of Ohio

[73] Assignee: Industrial Resources, Inc., Chicago, Ill.

[ * ] Notice: The portion of the term of this patent subsequent to Apr. 8, 1992, has been disclaimed.

[22] Filed: Mar. 22, 1974

[21] Appl. No.: 453,582

[52] U.S. Cl. .............. 423/244; 423/34; 423/36; 423/146; 423/42; 423/45; 75/101 R; 75/117

[51] Int. Cl.² ............ C01B 17/00; B01J 8/60; C01G 3/00; C22B 11/00

[58] Field of Search .............. 423/242–244, 423/34, 36, 42, 43, 45, 146

[56] References Cited

UNITED STATES PATENTS

| | | | |
|---|---|---|---|
| 2,296,423 | 9/1942 | Clark | 423/558 |
| 3,505,008 | 4/1970 | Frevel et al. | 423/244 |
| 3,793,430 | 2/1974 | Weston | 423/34 |
| 3,798,304 | 3/1974 | Weston | 423/34 |
| 3,876,537 | 4/1975 | Dulin et al. | 423/146 |

FOREIGN PATENTS OR APPLICATIONS 135,369  11/1949  Australia .............. 423/244

*Primary Examiner*—O. R. Vertiz
*Assistant Examiner*—Gregory A. Heller
*Attorney, Agent, or Firm*—Jacques M. Dulin

[57] ABSTRACT

Process for control of $SO_x$ emissions from copper smelter operations involving pyrometallurgical reduction of copper ores to elemental copper in which the gases from reverberatory furnaces, roasters, and/or converters are scrubbed with a sodium alkali sorbent to produce sodium sulfate and sulfite wastes. The cleaned flue gases are exhausted to the atmosphere. The waste sodium sulfate/sulfite material is then reacted with excess acid from the smelter acid plant and ferrous ion-rich barren solution from the associated cement copper operations to produce co-precipitated double salts of sodium ferric hydroxy-disulfates and/or sulfites (SFH), having low water solubility and being suitable for landfill type disposal without posing serious water pollution problems. This disposes of the sodium sulfite/sulfate waste materials from the air pollution control process and also strips the barren solution of iron prior to its recycle to heap or dump leaching operations. The reduction of ferrous iron concentrations in the recycle barren solution tends to reduce the opportunity for iron hydroxides to be formed in the dump thereby increasing production of copper from aqueous sulfuric acid type leaching operations.

10 Claims, 6 Drawing Figures

PROCESS FOR CONTROL OF SO$_x$ EMISSIONS FROM COPPER SMELTER OPERATIONS

RELATED APPLICATIONS

This case is related to our copending applications Ser. No. 411,367 filed Oct. 31, 1973, entitled Process for Insolubilizing Potentially Water Pollutable Wastes from Sodium or Ammonium Type Sulfur Dioxide Air Pollution Control Systems, now U.S. Pat. No. 3,984,312, issued Oct. 5, 1976, and its parent Ser. No. 353,508 filed Apr. 23, 1973, of the same title, dealing with "FERSONA" process chemistry, now abandoned in favor of said Ser. No. 411,367, the subject matter of which is incorporated herewith by reference.

Additional features are described in our copending application Ser. No. 411,365 filed Oct. 31, 1973 entitled Method of Insolubilizing Demineralizer and Cooling Tower Blowdown Wastes, now U.S. Pat. No. 3,876,537 issued Apr. 8 1975, which are incorporated by reference, particularly those dealing with rinse and filtration water ion exchange polishing and recycle.

FIELD OF THE INVENTION

This solution relates to an integrated process of control of SO$_x$ emissions from pyrometallurgical copper smelter operations and use of the waste products thereby to improve production of copper leaching operations. More specifically, the SO$_x$ emissions control process involves wet or dry sodium alkali scrubbing of the SO$_x$-rich off-gases from roasters, and/or converters, and/or reverberatory furnaces to produce sodium sulfate/sulfite waste products. These waste products are then disposed of by use in stripping ferrous iron values from the barren solutions exiting from cement copper operations prior to recycle of those solutions to copper leaching operation dumps or heaps. Excess waste sulfuric acid from the smelter acid plant is also disposed of in the process. The end-products from the combination of the sodium sulfite/sulfate, sulfuric acid and ferrous ion values are co-precipitated double salts of sodium ferric hydroxydisulfates and/or sulfites (SFH) which appear similar to natural compounds Sideronatrite, Natrojarosite, and Metasideronatrite. These materials are of relatively low water solubility and can be landfilled without posing a potential water pollution problem.

BACKGROUND

Copper smelters today represent a major source of SO$_x$ air pollution emissions. A typical copper smelters may exhaust 200 to 300 tons per day of SO$_2$ and SO$_3$ to the atmosphere, and pose very serious local air pollution problems. These off-gases result from conventional pyrometallurgical copper smelter operations including roasters, reverberatory furnaces, and converters.

Currently, the smelter industry is investigating hydrometallurgical processes for production of copper by means of aqueous ammonia solutions. However, if that technology proves feasible it is only a partial answer to the air pollution problem for future plants, and is not intended to cover the problems of retrofit in existing plants employing pyrometallurgical process techniques. It also appears applicable only to chalcocite (and possibly covellite, azurite, chrysocolla and malachite), but not particularly effective for iron-containing ores such as chalcopyrite or bornite. This leaching also is not particularly effective for recovery of gold and silver from ores containing such precious metals.

As for existing pyrometallurgical plants, and those currently planned or under construction, the copper industry is proposing the use of water scrubbers for production of sulfuric acid. However, these acid plants generally require relatively high SO$_2$ concentration in the flue gases for reasonable efficiency. In addition, they exhaust a tail gas containing sulfurous and sulfuric acid mist which itself poses some pollution problems. The use of acid plants is not generally designed to scavenge SO$_2$ or SO$_3$ from low SO$_2$ concentration gases such as gases coming from reverberatory furnaces and/or roasters. These gases generally contain only 0.5 to 2.5 percent SO$_2$ which only marginally can be controlled by acid plant type scrubbers. Normally, the scrubbers require the more concentrated off-gases, such as 6 to 12 percent SO$_2$-containing coverter off-gases.

In addition, the production of large quantities of sulfuric acid can pose a regional market glut of sulfuric acid which cannot be sold or otherwise used. Excess acid must therefore be disposed of. One common method of disposal is to dump the acid in natural limestone quarry formations. However, this itself poses a water pollution problem since limestone normally contains from 1 to 50 percent of magnesium carbonate. The reaction with sulfuric acid produces highly water soluble magnesium sulfate (an epsom salt having known laxative properties).

A certain portion of the acid can be used in heap, dump, inplace, or vat leaching operations. In copper mining operations, the better ore is forwarded to flotation concentrators, and the resulting beneficiated ore is then forwarded to the smelting operations for pyrometallurgical smelting to produce copper. Marginal, and/or submarginal, ore is normally placed on dumps or in heaps on asphalt, concrete, or similar impermeable pads. Presently used dumps range from 5.5 million to 4 billion tons of ore. Sulfuric acid or a liquor of sulfuric acid and ferric iron is introduced into the surface or interior of the dumps or heaps, and the liquor dissolves metals from the minerals. The principal copper oxide minerals dissolved by leaching are azurite, chrysocolla, and malachite. The primary copper sulfide minerals, chalcocite, chalcopyrite, and covellite also are dissolved during leaching. Pyrite is also oxidized during leaching to form ferrous sulphate and sulfuric acid. The effluent from the dumps or heaps forms a pregnant liquor rich in copper as CuSO$_4$. This pregnant liquor is then reacted with iron, typically in Launders or cone-type reaction tanks, to produce "cement" copper. The iron is generally in the form of tin cans or other types of shredded iron metal. Under the acidic conditions of the reaction, the cuprous ions are reduced to elemental copper which precipitates and is filtered out. The elemental iron is oxidized to ferrous iron and remains behind in the "barren solution." The theoretical iron consumption is 0.88 lb. Fe/1.0 lb. Cu, but in practice the consumption (known as the can factor) ranges from about 1.2–2.5 lbs. Fe/lb. Cu. The fine particulate elemental copper tends to naturally agglomerate into a hard mass, hence its name cement copper.

Typical values for copper leaching operations are illustrated by those for the Bingham Canyon, Utah operation:

| Parameter | Barren Liquor Input Into Dump | Pregnant Liquor Effluent From Dump |
|---|---|---|
| Maximum Flow Rate, gpm | 53,000 | 53,000 |
| pH | 2.8 to 3.0 | 2.5 |
| $H_2SO_4$ Added, g/l | 0.1 | 0 |
| lbs/1000 gal. | 0.834 | 0 |
| Copper Content, g/l | 0.12 to 0.18 | 1.80 |
| lbs/1000 gal. | 1.0 to 1.5 | 15.0 |
| Temperature, °F | 92 to 94 | 110 to 125 |

The presence of chemosynthetic autotrophic bacteria in the leach solutions or within the dumps promotes and accelerates oxidation of iron pyrite to ferrite sulphate and sulfuric acid and the oxidation of copper sulfides to copper sulfate. Oxidation rates are known to be accelerated by as much as 2000 to 1 at optimum temperatures of 95° F (35° C) for both pyrites and copper sulfides.

The "barren" solution, which is, in fact, rich in ferrous iron values, is then adjusted to a pH of 1.5 to 3.0 with sulfuric acid, and is recycled to the leach dumps. However, excess ferrous iron tends to form ferrous and ferric hydroxides and ferrous sulfate inside pipelines, and on the surface and interiors of the dumps if the pH gets too high. When the solution pH is above 3.0 the ferrous salts precipitate; generally a pH of 2.4 is required to prevent precipitation of salts, while a pH of 2.1 is required to redissolve precipitated salts. Thus, strict control of iron content and pH is necessary to minimize the precipitation of iron salts. But iron salt precipitation within the dumps is extremely difficult to overcome because the formation of impervious layers prevent the movement of leach solutions within the dumps. Copper bearing rock below the layers have no contact with leach solutions and leach efficiency is reduced. In an attempt to improve efficiency, the barren, ferrous-rich iron solutions are often passed to ferrous ponds where the pH is adjusted into the 4 to 5 range so that ferrous/ferric hydroxides and ferrous sulfate can precipitate. From these ponds, the supernatant liquor is readjusted to a pH in the 2 to 3 range and recycled to the dumps or heap leaching operation.

Although sodium alkalis are recognized as being better $SO_2$ sorbents than calcium alkalis from the point of view of reactivity and not posing scrubber scaling or plugging problems, the high water solubility of the end-product sodium sulfite and sodium sulfate has substantially prevented adoption of sodium alkalis for scrubbing of $SO_2$ in flue gases. Therefore, there has been an attempt to go to a regeneration type scrubbing operation such as the Wellman-Lord sulfite/bisulfite process, or the double alkali process. The Wellman-Lord process involves scrubbing $SO_2$-containing flue gases with bisulfite which combines with the $SO_2$ to form sodium sulfite. This is then regenerated to the bisulfite form and the scrubbing is repeated. The double alkali process involves the use of sodium within the scrubber. The scrubber liquor is then reacted with calcium oxide (lime) alone or also with calcium carbonate (limestone) in one or more tanks exterior to the scrubber. The sodium values are recycled while calcium sulfite/sulfate sludge is removed.

However, these processes are expensive from the point of view that the capital cost of equipment for regeneration brings the total $SO_x$ control equipment cost to more than double that for scrubbing equipment alone. Further, the sulfite/bisulfite process forms some sodium sulfate crystals which must be continuously bled from the operation. The purge streams amount to 5 to 25 percent of the input sodium, and this material is highly water soluble and must be disposed-of.

As for the double alkali process, the preferred scrubber effluent is sodium sulfite since the sulfite-lime reaction is faster than sulfate-lime. However, sodium sulfate appears predominant under typical scrubber conditions. In addition, the end-product calcium sulfate/sulfite forms a thixotropic sludge which is very difficult and expensive to dispose of since it will not dewater to more than about 50 percent solids. The disposal of the sludge involves transportation of excess water which is expensive.

The sludge cannot be piled above ground since it will not support its own weight. Current disposal involves placing the sludge in clay pits or ponds. However, there is concern over that disposal technique due to the ability of gypsum to increase the porosity of clay. Where the porosity of the clay disposal pond is increased, magnesium sulfate can leach therefrom. Magnesium sulfate is present in sludge because of the 1–50 percent $MgCO_3$ or $MgO$ present in limestone or lime. In addition, wet scrubbing tends to collect heavy metals which then pose a possiblity of water pollution if they leach from such ponds.

In the hydrometallurgy art, proposals have been made to remove metals, e.g. iron and/or aluminum, alone or concurrently, from copper dump leachate solutions.

Thus, for example U.S. Pat. No. 2,296,423 discloses a method whereby acid solutions containing iron (or iron and aluminum) are subjected to high temperature and pressure in an autoclave to hydrolize sulfates of ferric iron an aluminum and precipitate basic salts with a simultaneous generation of free acid. According to the patent, oxidation of iron to the ferric state is promoted by the direct injection of oxygen into the solution while the solution is at high temperature and pressure. The patent teaches the addition of an alkali salt, e.g., sodium sulfate or sodium chloride, to promote the precipitation. Soluble iron oxides are added to partly consume the free acid generated in the autoclave operation. The precipitate formed under the conditions taught by the patent is disclosed to be a double basic salt of alkali metal and iron, $Na_2SO_4 \cdot 3 Fe_2 (OH)_4 \cdot SO_4$, somewhat analogous to, but apparently different from the natural mineral Natrojarosite, $NaFe_3(SO_4)_2(OH)_6$. The patent further teaches that if aluminum is present in the solution both the iron and aluminum can be nearly completely precipitated as a complex basic iron aluminum alkali sulfate.

U.S. Pat. No. 3,434,947 is directed to separation of iron from zinc sulfate solutions produced in hydrometallurgical leaching of "Calcine", a roasted sulfide ore concentrate. The iron is precipitated in the presence of $K^+$, $Na^+$, $NH_4^+$ ions in a concentration of 1/10 to ¼ the amount of the iron content in g/l. Ferrous ion is oxidized to ferric ion by $MnO_2$, and the solution is partly neutralized with ZnO prior to the precipitation. The basic iron sulfate precipitated is described in related U.S. Pat. No. 3,684,490 as being jarosite, but the source of the $K^+$, $Na^+$ and/or $NH_4^+$ is an unnamed salt.

Sideronatrite, Metasideronatrite, Natrojarosite, and Ammoniojarosite are found in nature (See Palache, C.; Berman, H.; Frondel, C.; Dana's System of Minerology, Vol. II, John Wiley & Sons, 7th Ed., 1951, pp. 562, 563, 603, 604). However, the conditions under which formation of these compounds occurred in nature is unknown. Scharizer, in Zs.Kr., Vol. 41 (1906), p. 215, reports formation of Sideronatrite by slow precipitation at room temperature over a period of months. Mellor, "A Comprehensive Treatise of Inorganic & Theoretical Chemistry", Vol. 14, p. 345 (1935), Longmanns Green & Co., reports on work by Skrabal, A., Zeit. anorg. Chem., Vol. 38 (1904), p. 319, as preparing Sideronatrite under conditions of high Na, Fe and $SO_4$ concentration by heating sodium and ferric sulfate in the presence of suluric acid on a hot plate at an unknown temperature.

Therefore, there is a great need for a process for control of $SO_x$ emissions from pyrometallurgical smelter operations, both retrofit and new plants. There is also a need for a process which can employ sodium, yet in which the sodium sulfite/sulfate waste material can be a useful product elsewhere in the overall copper operations. There is also a need for improving the efficiency of heap and dump leaching, and preventing the plugging of the dumps by formation of ferrous and ferric salt compounds within the dump which reduces efficiency.

THE INVENTION

OBJECTS

It is therefore an object of this invention to provide an improved process of $SO_2$ emissions control by the use of sodium alkalis in wet or dry scrubbing.

It is another object of this invention to provide a process for scrubbing of flue gases from copper smelter operations, more specifically roasters, reverberatory furnaces, and converters.

It is another object of this invention to scrub smelter flue gases and tail gases with sodium alkalis and to dispose of the waste sodium sulfite/sulfate carbonate materials produced, by reaction with sulfuric acid and ferrous or ferric iron values.

It is another object of this invention to provide a process which may improve the efficiency of heap or dump leaching operations wherein a sulfuric acid leach liquor is used to leach copper values from low grade ore.

It is another object of this invention to strip ferrous iron values from barren liquor prior to the recycle of that liquor to copper dump or heap leaching operations, which stripping operation may be bacterially activated or enhanced.

It is another object of this invention to provide an integrated smelter process wherein the waste material from a sodium alkali scrubbing of $SO_x$-containing flue or tail gases is used to scavenge and strip ferrous values from barren liquor prior to recirculation to the heap or dump leaching operations, thereby improving the efficiency of those leaching operations while simultaneously disposing of the $SO_x$ emissions control wastes.

It is another object of this invention to reduce the solubility of sodium sulfite/sulfate air pollution control wastes produced from the scrubbing with sodium alkalis of the flue gases and tail gases from copper smelter operations by reaction with liquors coming from copper leaching operations, the insolubilized products being coprecipitated double salts of sodium ferric hydroxydisulfates or sulfites and having a water solubility less than that of the standard in the industry, calcium sulfate (2.3 grams per liter).

Still further and other objects of this invention will be evident from the description which follows.

THE FIGURES

SUMMARY

Figure 1:
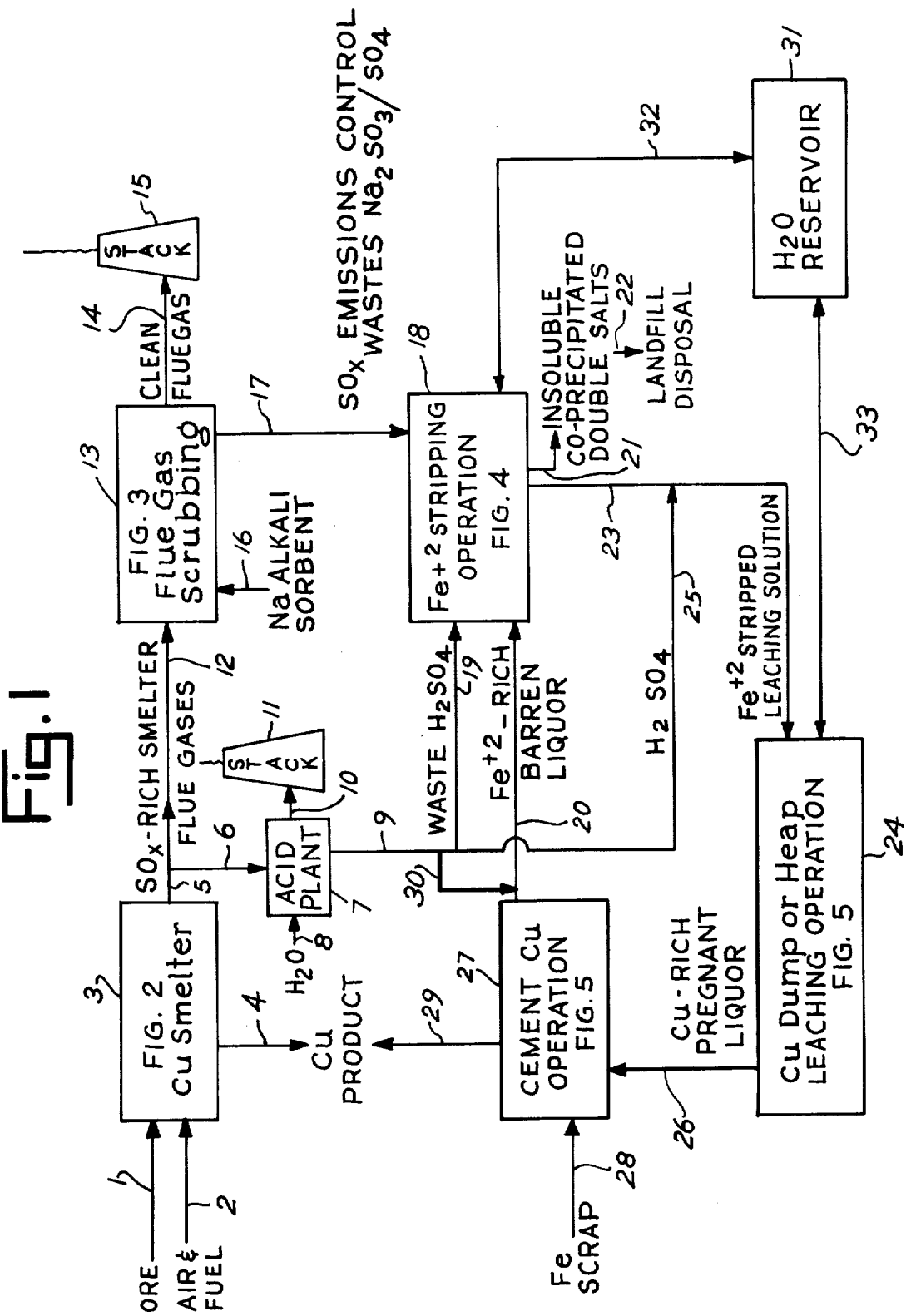
FIG. 1 is a schematic flowsheet of the overall integrated process of this invention showing the relationship of the $SO_x$ scrubbing to the pyrometallurgical smelter operations, and the disposal of the scrubbing wastes in connection with the leaching operations.

A sodium alkali scrubbing process is used to remove $SO_x$ values from flue gases coming from copper smelter pyrometallurgical operations such as roasters, reverberatory furnaces, and/or converters. Preferred processes involve both dry and wet sodium alkali scrubbing.

For dry processes, it is preferred to use Nahcolite Ore in conjunction with a baghouse to produce a baghouse filter cake containing sodium sulfite, sodium sulfate, unreacted sodium carbonate and residual smelter dust. For wet processes, it is preferred to use Nahcolite Ore, sodium carbonate, or sodium hydroxide in an aqueous solution in a suitable scrubber for contact with the flue gases to produce a liquor rich in sodium sulfite and sodium sulfate values. This liquor may be used as such or concentrated before passing to the ferrous stripping and disposal stage. A hybrid process, involving spraying at low liquid-to-gas ratios a solution of sodium carbonate, Nahcolite Ore (a sodium bicarbonate), or sodium hydroxide into the hot flue gas, at a rate which produces a spray-dried sodium sulfite/sulfate product, and then collecting this product in a mechanical or electromechanical collection device such as a cyclone, an electrostatic precipitator, or a baghouse, or combinations of those devices, may also be employed.

The waste sodium sulfite/sulfate/carbonate product produced in the $SO_x$ scrubbing is then combined in a reactor, such as a pond or tank with barren liquor exiting from a cement copper operation. This barren liquor is rich in ferrous ion values. The pH is adjusted and controlled by addition of waste sulfuric acid coming from the smelter acid plant. Coprecipitated double salts of sodium ferric hydroxydisulfates and sulfites (SFH) are produced in the reactor tank or pond. The reaction zone may contain chemosynthetic autotrophic bacteria to assist in oxidizing ferrous ion to ferric ion. These materials may be left in the pond, or periodically or continuously removed and disposed of by landfill operations.

The coprecipitated double salts have solubilities generally below that accepted for landfill operations of air pollution control waste materials. The accepted standard is calcium sulfate which has a solubility on the order of 2.3 grams per liter. The starting sodium sulfate/sulfite wastes have solubilities on the order of 100 to 400 grams per liter. In contrast, the end-product coprecipitated double salts have solubilities on the order of 0.5 to 0.02 grams per liter. These products can thus be safely disposed of by conventional landfill operations.

In the process of forming the coprecipitated double salts, the supernatant liquor is stripped of ferrous values. The stripped, barren liquor is then adjusted to a pH within the range of 1.5 to 3.0 and recycled to the leaching dumps. Because of the low ferrous/ferric values in the recycle liquor, there is little contribution to formation, from that liquor, of ferrous/ferric hydroxides or ferrous sulfate within the dump, and accordingly less plugging of the dump by those materials. Leaching operation efficiency may be improved for this reason.

DETAILED DESCRIPTION

The following detailed description is by way of example and not by way of limitation of the principles of this invention, and has reference to the accompanying figures which are representatively illustrative of the invention.

In order to best show the broad application of the principles of this invention, typical generic type of copper operations are shown rather than specific situations. Thus, for example, the copper smelter operation is a representative smelter operation and does not illustrate a specific copper smelter plant. Similarly, the flue gas scrubbing may be done with a variety of sodium alkalis. Shown however is a single process, the Nahcolite Ore dry process, which is by way of example of various types of sorption processes. The disposal and ferrous stripping operation are shown in connection with a pond type of operation. This is meant as generic since the operation could be done in reaction tanks, or a series of ponds or the like. Likewise, the leaching operation is shown as a dump leaching rather than heap leaching operation by way of illustration, but it should be understood that the leaching may be either or both. Likewise, the cement copper operation may employ launders or cones.

FIG. 1 illustrates schematically the relationship of the various portions of the overall process. The details of these portions are shown in FIGS. 2 through 6 and are cross-referenced to this FIG. 1.

Figure 2:
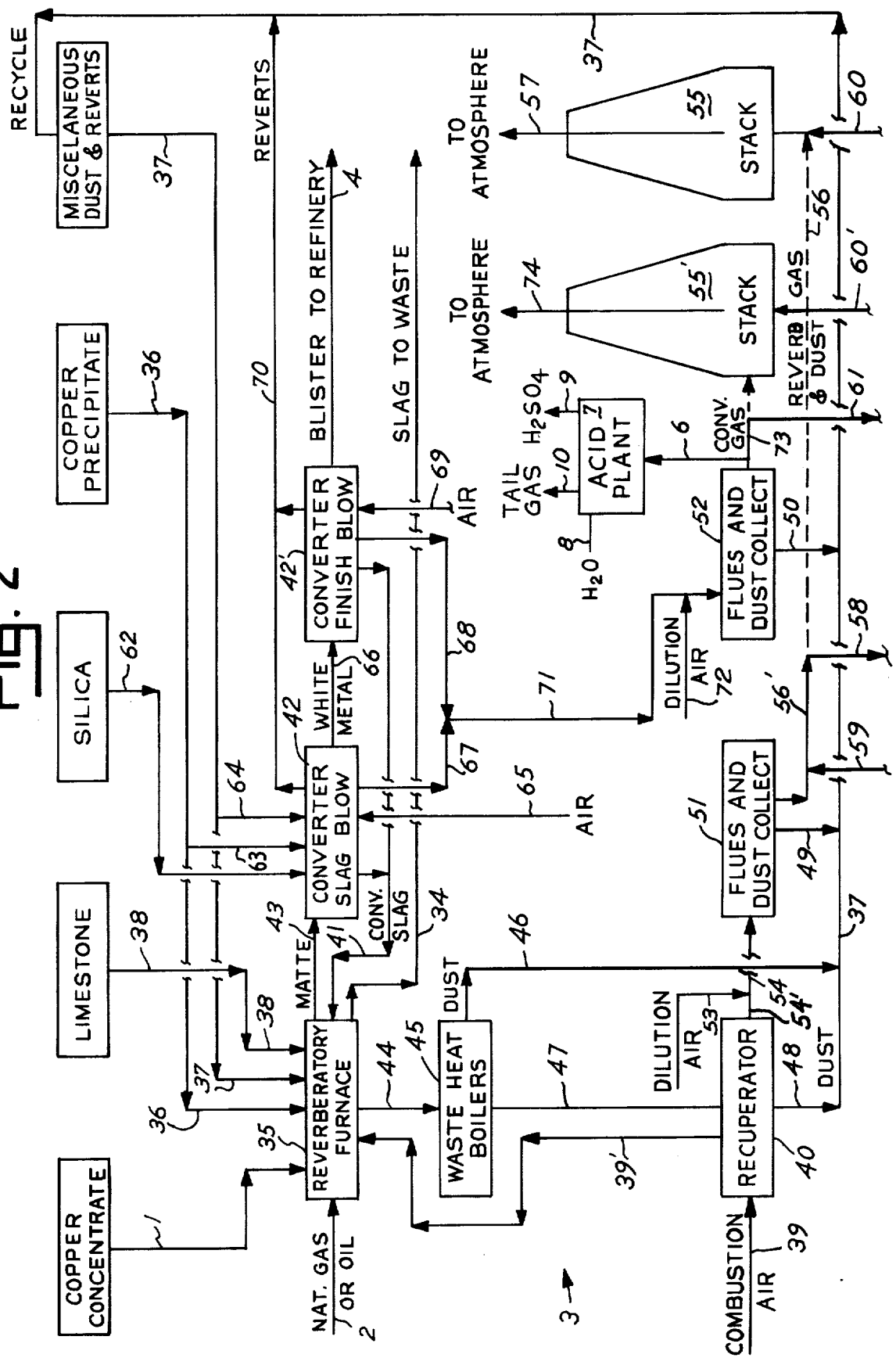
FIG. 2 is a schematic flowsheet of a typical copper smelter pyrometallurgical operation producing $SO_x$-rich flue gases from reverberatory furnaces and converters.

A concentrated coper-bearing ore 1 is pyrometallurgically reduced with air and fuel 2 in smelter operation 3 to produce a copper product 4. Details of the smelter operation are shown in FIG. 2. The smelting operation produces one or more flue gas streams 5 which are rich in sulfur dioxide and sulfur trioxide. These streams are normally in the range of 0.5 to 12 percent. The richest of the streams may be directed via line 6 to a conventional acid plant operation 7 which uses water 8 to scrub the flue gas, producing waste sulfuric acid 9 and a tail gas 10 which is exhausted to the atmosphere by means of stack 11. The remaining flue gas 12 is then passed through $SO_x$ scrubbing process 13 which employs a sodium sorbent 16 to produce a clean flue gas 14 which is exhausted to the atmosphere via stack 15.

In the process sodium alkali 16 is used to react with the $SO_2$ and $SO_3$ producing waste sodium sulfites and sulfates material 17.

In the $Fe^{+2}$ stripping operation portion 18 of the overall integrated process, the waste sodium sulfite/sulfate stream 17 is combined with a portion of the sulfuric acid 19 and the ferrous ion-rich barren liquor 20 to produce relatively insoluble co-precipitated double salts 21 which may be disposed of by conventional landfill 22. The supernatant ferrous ion-stripped barren liquor 23 is recycled to leach dump 24 after adjustment with sulfuric acid 25 to the appropriate pH. Issuing from the bottom of the dump is copper-rich pregnant liquor 26 which is then passed through cement copper operation 27 employing a source of scrap iron 28 to produce a copper product 29. Issuing from the cement copper operation is the ferrous ion-rich barren liquor 20 which is cycled to the $Fe^{+2}$ stripping operation 18 as above described. The pH of the barren liquor may be adjusted by addition of sulfuric acid 30.

Water balance may be maintained between the $Fe^{+2}$ stripping portion of the operation and the dump leaching operations by means of reservoir 31 and lines 32, 33.

The smelter operation 3 may include roasting operations but more preferably involves reverberatory furnaces and converters using one or more slag and finish blows. Other reactants for the smelting operations are included in the detailed description of FIG. 2.

Figure 3:
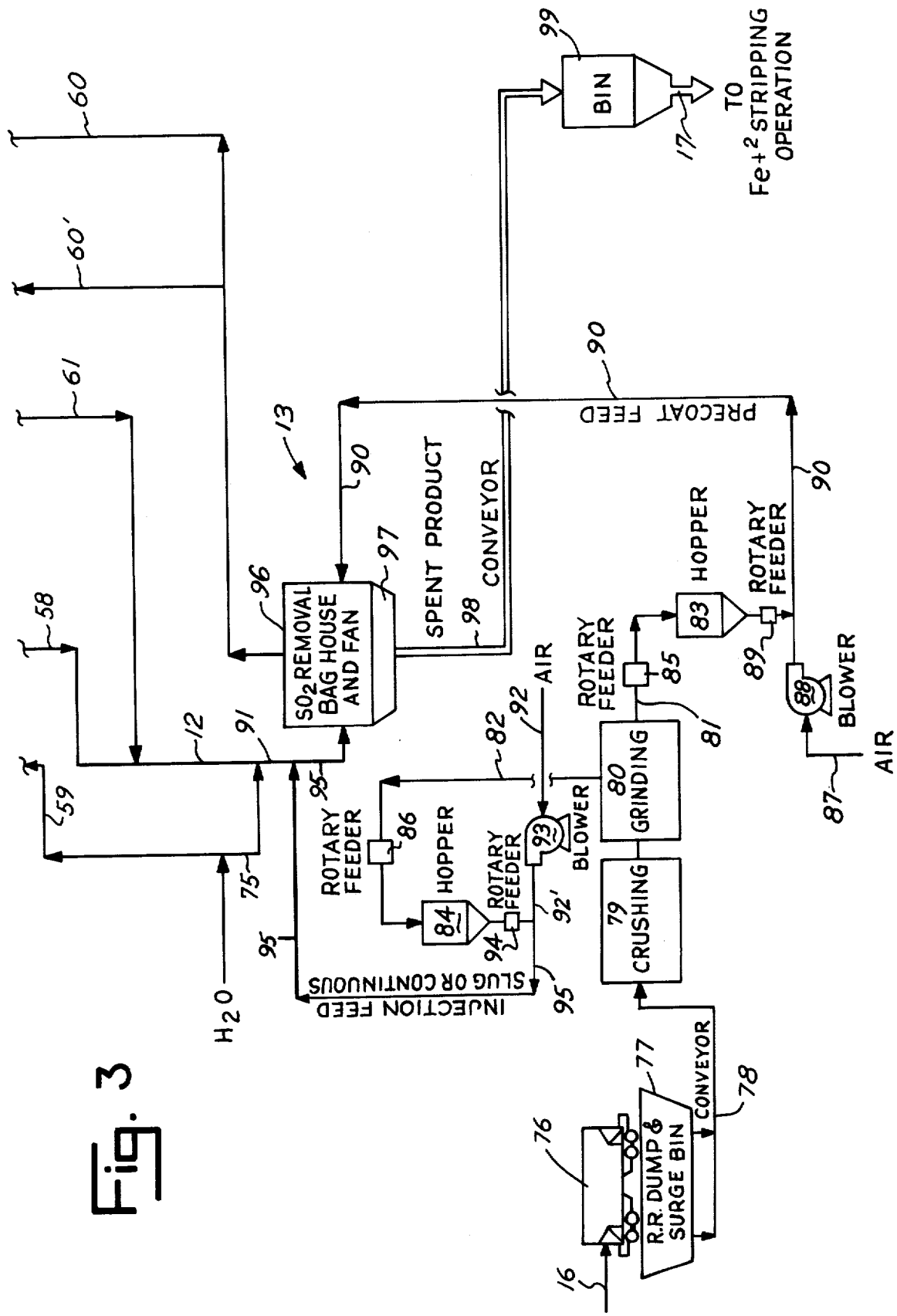
FIG. 3 is a schematic flowsheet of one method of scrubbing the $SO_x$-containing smelter flue gases employing Nahcolite Ore in a dry scrubbing process and producing sodium sulfite/sulfate waste material.

The $SO_x$ scrubbing operation may be a wet, a dry or a hybrid type of process involving the use of a sodium alkali as the sorbent to react with the $SO_2$ and the $SO_3$ in the flue gas to produce the waste sodium sulfate and sulfite. FIG. 3 describes in detail one preferred type of operation, a dry process involving the use of Nahcolite Ore, a sodium bicarbonate-containing mineral. The leaching operation may be a dump, heap, vat or in situ type of leaching operation. Likewise, the cement copper operation may be a classical launder type of operation or the more recent cone-type of operation.

The actual processing operations within the smelter, the dump and the cement copper operations do not form a part of this invention per se apart from their combination in the integrated process. Further, general background relating to the $FE^{+2}$ stripping portion of the integrated process is contained in our copending application Ser. No. 411,637 filed Oct. 31, 1973, which in turn is a continuation in part of our copending application Ser. No. 353,508, filed Apr. 23, 1973 abandoned in favor of the latter filed case, the disclosure of both cases being incorporated by reference herein. Other details, principally polishing rinse or filtration water from precipitate 21 or excess $Na^+$ ions from stripped solution 23, by ion exchangers is found in our copending application Ser. No. 411,365 filed Oct. 31, 1973.

Figure 4:
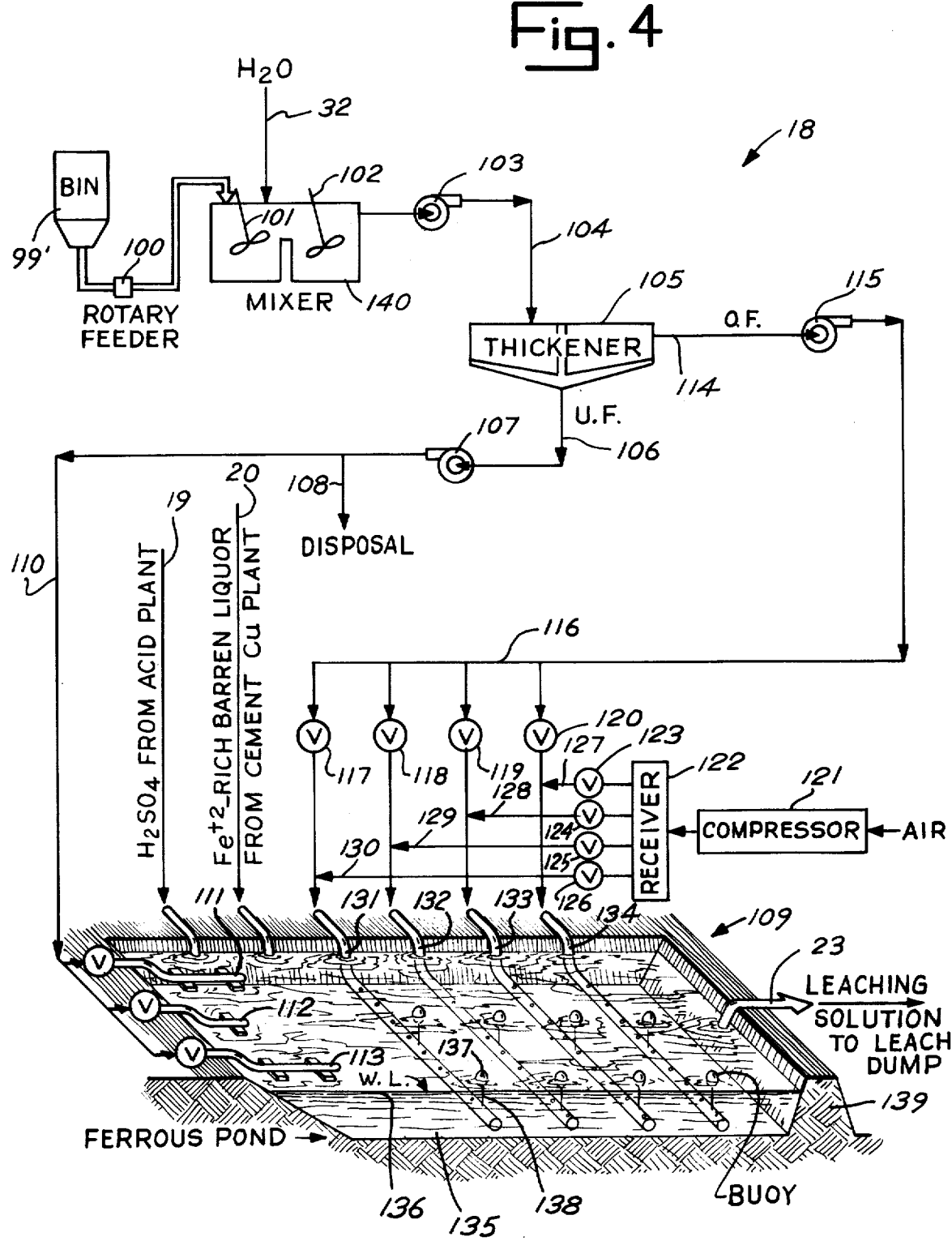
FIG. 4 shows the simultaneous ferrous ion stripping and disposal of the sodium sulfite/sulfate waste material produced in the flue gas scrubbing operation of FIG. 3 by combination with waste sulfuric acid and the ferrous-rich barren solution from the cement-copper operation.

Turning now to the detailed operation of the smelter, FIG. 2 shows a typical copper smelter operation as described in National Technical Information Service Document PB 184,885, dated June 1969. Except as it relates to the overall combination, the copper smelting process of FIG. 2 per se is not our invention. While the details of copper smelting operations are not critical to this invention, they are described next below for completeness and understanding of the production of flue gases containing $SO_2$ and $SO_3$ by pyrometallurgical processes. In FIGS. 2 through 4, all tonnages are given for a 24-hour period in short tons. The tonnages for the $SO_x$ scrubbing 13 and the insolubilization and ferrous ion stripping operation 18 are related back to the tonnage operations of the copper smelter in FIG. 2.

The reverberatory furnace 35 is fed with copper concentrate 1, copper precipitate 36, miscellaneous dust and reverts 37 and limestone 38. On a 24-hour period basis in short tons, these components contain, respectively, the following amount of sulfur: 218 tons in the copper concentrate, 0.4 tons in the copper precipitate, 9.4 tons in the miscellaneous dust and reverts, and substantially none in the limestone. Combustion air 39 is preheated to approximately 100° F in recuperator 40 and passed via duct 39' to furnace 35 where it is combined with natural gas or oil fuel 2 to fire the reverberatory furnace. Converter slag 41 containing 5.2 tons of sulfur is also supplied to the reverberatory furnace 36 from the converter 42, 42' both during the slag blow and finish blow of the converter.

On a daily basis, the reverberatory furnace 35 produces approximately 482 tons of slag 34 containing about 4.8 tons of sulfur. The first stage of copper production is a copper matte 43 which contains 155 tons of sulfur on a daily basis and is passed to the converter 42. The hot flue gas 44 passing from the reverberatory furnace 35 is passed through waste heat boilers 45 wherein heat is recovered to form steam for other operations of the plant. At the same time dust 46 is removed from the flue gas. The temperature of the flue gas in line 44 ranges from approximately 1800°–3000° F. After passing through the waste heat boilers, and prior to passing through the recuperator 40, the flue gas 47 is at a temperature of 800° F, has a volume of 40,500 SCFM and in 24 hours contains 63.7 tons of sulfur. An additional portion of dust 48 is collected in the recuperator 40 where the hot flue gas is heat exchanged with the incoming combustion air 39. The collected dust 46 and 48 are combined with other dust 49, 50 from flues 51 and 52 and recycled, as shown by line 37, to the reverberatory furnace 35 and the converter 42 via line 64 during the latter's slag blow cycle.

Dilution air 53 may be added to the reverb flue gas 54 and conveyed by flues 51 to the stack 55 via line 56. The reverb gas 57 is presently exhausted to the atmosphere without $SO_x$ pollution control facilities. The reverb gas 57 has the following specifications for the tonnages above-mentioned: The amount is 285,000 SCFM at 350°±20° F and contains 63.7 tons of sulfur per day in the form of $SO_2$ and $SO_3$ gas, an estimated 1.3 tons of dust, and 0.2 tons of sulfur in dust, predominantly solid sulfates.

It should be understood that those values are present values without the use of $SO_x$ scrubbing. By the process of this invention, the reverb flue gas 56 is diverted through line 58 to the scrubbing operation 18 (FIG. 3) to be described in more detail below. Optionally, reverb gas 56' may be quenched from its normal temperature of approximately 450°–650° F down to a temperature of less than about 500°–550° F by addition of water spray 59. The water spray 59 may be omitted where a higher temperature is needed in the scrubbing operation, or the flue gas 56' may be cooled by dilution air inlet into the flue gas. The temperature of the flue gas in line 58 is controlled depending upon the scrubbing process as is described in more detail below. After passing through the scrubbing apparatus the cleaned flue gas is returned to stack 55 via line 60. With the $SO_x$ scrubbing process as described in detail below, typical clean flue gas 60 after scrubbing would have a volume on the order of 312,000 SCFM at 315° F and contain only 6.4 tons of sulfur on a 24-hour basis, 0.013 tons of dust and 0.002 sulfur in dust form. This is a removal of approximately 90 percent of the sulfur and approximately 99 percent of the residual dust currently being exhausted as flue gas 57 from stack 55.

The $SO_x$ scrubbing portion of the integrated process may be applied only to the diverted reverb gas 58, or it may optionally also be applied to scrub diverted converter gas 61. All or only a portion of the reverberatory flue gas and/or the converter gas may be scrubbed. When the converter gas is scrubbed, its temperature may likewise be controlled by water injection or dilution air analogous to lines 59 and 53 applied to reverb flue gas.

In copper smelting operations, the copper matte 43 is passed to a converter 42 to which is also added silica 62 (containing only a negligible amount of sulfur), a portion of the copper precipitate 63 (containing approximately 0.1 ton of sulfur), and miscellaneous dust and reverts 64 (containing about 6.7 tons of sulfur). By injection of 5,700 SCFM of air 65 at a temperature of 100° F, on the basis of 10 hours per converter day for 14 converters, the copper sulfide in the converter is further reduced, and the sulfur oxidized to $SO_2$, to form white metal 66.

The white metal is then further reduced during the converter finish blow operation 42' to refinery blister copper 4 by oxidation of the sulfur with air 69. Based on a 5-hour-per-converter day using 14 converters, approximately 6,000 SCFM gas at 100° F is used during the converter blow. The white metal 66 as it passes to the finish blow operation contains approximately 0.3 tons of sulfur. Reverts 70 from the converters 42, 42' are recycled via line 37 back to the reverberatory furnace 35 and converter 42.

Depending on the number of slag and finish blows, the converter flue gas composition is as follows: Where there are two slag blows, the converter flue gas 67 is at 2300° F, has a volume of 10,600 SCFM and contains on a 24-hour basis 12.0 tons of sulfur in the gas. Where there are two slag blows in converter 42 and one finish blow from converter operation 42', the flue gas in line 71 (combined slag off-gas 67 and finish off-gas 68) is at a temperature of 2250°–2300° F, has a volume of 16,700 SCFM and contains 89.6 tons of sulfur in the gas form as $SO_x$. Where there is one slag and one finish blow, the combined converter flue gas in line 71 is at 2200° F, has a volume of 11,400 SCFM and contains 42.6 tons of sulfur in the gas form as $SO_x$.

This hot flue gas 71, ranging from 2200° to 2300° F, is ordinarily cooled by dilution air 72 and passed through flues 52 in which dust 50 falls out. The gases in flues 51 and 52 may also pass through electrostatic precipitators or mechanical cyclones or other types of dust collection devices (not shown) prior to passing to the stacks. The converter gas 73 at present is passed to stack 55' where it exhausts to the atmosphere. The composition of the gas 74 exhausting to the atmosphere is as follows: The temperature is approximately 300° F, the volume is 240,000 SCFM, and it contains 149.2 tons of sulfur in gaseous $SO_x$ form on a 24-hour basis. It also contains an estimated quantity of 1.5 tons of dust, and 0.1 tons of sulfur in dust form, predominantly sulfates or sulfur adsorbed or adhered to the dust particles.

According to the process of the present invention, the converter gas may be diverted through line 61 and scrubbed of 90 percent of the $SO_x$ and 99 percent of the dust before being returned to stack 55' as clean flue gas 60'. It should be understood that the stack 55 is the same as stack 55', just as the converter 42 and 42' is the same converter used for both slag and finish blows sequentially. Showing the stacks and converters separately merely assists in understanding the options under the present process.

A portion of 6 of the converter gas 73 may be routed to the acid plant 7 where water feed 8 produces $H_2SO_4$ 9 and tail gas 10 as described above with respect to FIG. 1.

The $SO_x$ scrubbing portion 13 of the process may be any wet or dry $SO_x$ scrubbing process employing a sodium additive and producing sodium sulfites and sulfates by-products or waste products. In addition, the sulfite/bisulfite process employing recycle may be used, and the purge stream from that process containing quantities of sodium sulfate, sodium sulfite, sodium bisulfite, and disproportionated sodium thiosulfite may be used as feed stream to the $Fe^{+2}$ stripping operation portion 18 of the process (See FIGS. 1 and 4).

For the $SO_x$ emissions control portion of the process (FIG. 3) we prefer a dry process employing a baghouse as the collection device, and Nahcolite Ore, a natural ore containing sodium bicarbonate values, as the $SO_x$ sorbent. However, it should be understood that where desired, the baghouse may employ a sodium carbonate, a sesqui-carbonate (a cocrystal of carbonate and bicarbonate), Trona, or the like. However, in the case of these latter sodium sorbents containing any substantial quantities of sodium carbonate, the efficiency is substantially lower. To obtain $SO_x$ removal efficiencies similar to the use of sodium bicarbonate or Nahcolite Ore, the temperature in the baghouse should be greater, and/or the residence time should be longer, and/or the air to cloth ratio lower. For example, for similar process conditions, sodium carbonate is on the order of 60–64 percent as efficient as sodium bicarbonate.

In the case of wet scrubbing, any sodium alkali may be used in the wet scrubbing liquor passed through the scrubber and contacted with the diverted reverberatory and/or converter flue gas. The sodium alkali is preferably Nahcolite Ore, a sodium carbonate, Trona, sodium bicarbonate, sodium sesquicarbonate, or sodium hydroxide.

We also contemplate using a hybrid type of process wherein an aqueous solution of sodium alkali, such as sodium bicarbonate, sodium carbonate or sodium hydroxide is sprayed into a spray drier at a low liquid-to-gas ratio (ordinarily less than about 5.0 and preferably less than about 1.0 gallon per mcf) in a controlled manner so that the heat of the flue gas dries the sodium sulfite/sulfate product which is produced by the gas/liquid reaction between the entrained $SO_x$ gas and the aqueous alkali. The dried sodium sulfite/sulfate is then collected in a mechanical or electromechanical collection device such as a cyclone, an electrostatic precipitator, a baghouse, a panel bed filter, granular bed filter, or an apitron (hybrid fabric filter and electrostatic device.)

We also contemplate employing a fluidized bed of a sodium alkali such as sodium bicarbonate, Nahcolite Ore, sodium carbonate or Trona followed by mechanical or electromechanical collection devices as set forth above. One particularly useful device is a fluidized bed vessel having fabric filters disposed in the disengagement space above the bed surface. These fabric filters, ordinarily in the shape of bags or envelopes, depend from the top of the vessel like fingers of a glove, and permit shaking down of the reaction product into the bed.

More details of the above type of wet and dry scrubbers are set forth in our copending applications Ser. Nos. 411,367 and 353,508. In the interest of conciseness, these disclosures are herewith incorporated by reference.

The sodium sorbents contemplated herein include sodium hydroxide (spray driers and scrubbers only), soda ash of various grades, sodium carbonate, several hydrous and anhydrous types of sodium sesquicarbonate, Trona ($Na_2CO_3.NaHCO_3.2H_2O$), sodium bicarbonate, Nahcolite ($NaHCO_3$), Wegscheiderite ($Na_2CO_3.3NaHCO_3$), Thermonatrite ($Na_2CO_3.H_2O$), Natron ($Na_2CO_3.10H_2O$), Dawsonite ($NaAlCO_3(OH)_2$), Eitelite ($Na_2CO_3.MgCO_3$), Shortite ($Na_2CO_3.2CaCO_3$), Pirssonite ($Na_2CO_3.CaCO_3.2H_2O$), Gaylussite ($Na_2CO_3.CaCO_3.5H_2O$), Burbankite, ($Na_2Ca_4(CO_3)_5$), Northupite ($Na_2Mg(CO_3)_2.NaCL$), Bradleyite ($Na_3MgCO_3PO_4$), Tychite ($Na_6Mg_2(CO_3)_4(SO_4)$), crude Trona-type brines from Searles Lake or Owens Lake, Calif., alkalized alumina, sodium sulfite, sodium bisulfite, and other authigenic sodium-containing minerals. Mixtures of the additives are included.

For example the sodium sorbent may be crushed, Nahcolite Ore, either crude (raw) or calcined. As set forth below in Table I, the analyses of the raw Nahcolite Ore is shown in Samples 1, 2 and 4, and the calcined Ore in Sample 3. Samples 1–3 were −200 +325 mesh, while Sample 4 was −28 +±mesh. All values are percent by weight.

Table I

| Analyses of Raw and Calcined Nahcolite Ore | | | | |
|---|---|---|---|---|
| | Samples | | | |
| Component | 1 | 2 | 3* | 4 |
| $NaHCO_3$ | 84.7 | 84.7 | 0.0 | 77.7 |
| $Na_2CO_3$ | 2.1 | 2.1 | 86.4 | 2.7 |
| Subtotal | (86.8) | (86.8) | (86.4) | (80.4) |
| Moisture | 2.0 | 2.0 | 0.0 | 2.3 |
| Water Insolubles | 8.7 | 8.7 | 13.6 | 12.3 |
| Organics | 2.5 | 2.5 | 0.0 | 5.0 |
| Total Chlorine | 0.01 | 0.01 | — | — |
| Total | 100.00 | 100.00 | 100.0 | 100.0 |

| COMPOSITION OF WATER INSOLUBLE MATERIAL IN NAHCOLITE ORE SAMPLES | | | |
|---|---|---|---|
| | Ultimate | Samples | |
| Component | Analysis | 1&2 | 3* | y |
| $CaCO_3$ | 39.5 | 3.44 | 5.37 | 4.86 |
| $MgCO_3$ | 19.8 | 1.72 | 2.69 | 2.44 |
| $SiO_2$ | 24.7 | 2.45 | 3.36 | 3.04 |
| $Al_2O_3$ | 7.1 | 0.65 | 0.97 | 0.87 |
| $Fe_2O_3$ | 3.8 | 0.33 | 0.52 | 0.47 |
| $Na_2O$ | 2.7 | 0.23 | 0.37 | 0.33 |
| $K_2O$ | 2.4 | 0.21 | 0.33 | 0.30 |
| Total | 100.0 | 8.70 | 13.61 | 12.31 |

*Calcined Ore; other samples are raw ore.

For example, the reactor may be a baghouse, typically operating in the range of from about 250°–600° F, or higher, depending on the temperature limitations of the bag fabric. The sorbent, such as ground Nahcolite Ore, is coated on the bags, and reacts with the sulfur trioxide and sulfur dioxide in the converter and/or reverb flue gas to produce sodium sulfate and/or sodium sulfite in the form of a cake, which cake also contains residual fly ash. The reaction product cake is predominantly sodium sulfite and sulfate, but may contain sodium bisulfate and sodium bisulfite. Under oxygen deficient conditions in flue gas the sulfite/sulfate ratio is generally greater than 0.5, typically in the range of 1–6.

The waste cake also contains other residual minerals due to the presence therein of reacted or unreacted species present in the original sodium-compound feed or fly ash. For example, in the case of Nahcolite Ore, the predominant species would be calcium, magnesium and sodium carbonates (the latter derived from sodium bicarbonate in the $SO_2$ removal process by action of heat), silica and alumina, Dawsonite, potassium feldspar, calcite, kerogens (organics), iron and sulfur (organic and $FeS_2$). In the description below initial attention will be focused on the sodium sulfite/sulfate salts, without consideration of residual carbonates, to facilitate understanding. Then the discussion will show the effect of carbonates in the overall stripping process.

The sulfur-containing salt produced by reaction of the $SO_x$ containing flue gas, (e.g. "sulfate" cake, or scrubber liquor), may be generically characterized as:

$$Na_xH_ySO_z$$

wherein $x$ is 1 or 2, $y$ is 0 or 1, and $z$ is 0, 3 or 4, and the mixtures thereof.

For raw and calcined Nahcolite Ore sorbents, the composition of the reacted waste cake corresponding to Samples 1–4 in Table I above are:

Table II

| DUST CAKE ANALYSIS OF RAW AND CALCINED NAHCOLITE ORE AFTER REACTION WITH $SO_x$ | | | | |
|---|---|---|---|---|
| | Samples | | | |
| Component | 1 | 2 | 3* | 4 |
| $NaHCO_3$ | 5.9 | 5.0 | 10.4 | 1.4 |
| $Na_2CO_3$ | 32.3 | 21.0 | 34.6 | 1.6 |
| $Na_2SO_3$ | 33.4 | 49.6 | 20.2 | 51.3 |
| $Na_2SO_4$ | 12.9 | 8.7 | 20.9 | 24.5 |
| Subtotal | (89.5) | (84.3) | (86.1) | (78.8) |
| Moisture | 0.8 | 1.0 | 2.3 | 0.9 |
| Insolubles | 11.4 | 11.4 | 11.6 | 14.4 |
| Organics | 3.3 | 3.3 | 0.0 | 5.9 |
| Total | 100.0 | 100.0 | 100.0 | 100.0 |

*Calcined Ore; other samples are raw ore.

Turning now to FIG. 3, this figure shows by way of example a dry $SO_x$ scrubbing operation 13 in which Nahcolite Ore is used as the $SO_x$ sorbent and produces a sodium sulfite/sulfate waste product. The temperature of the diverted reverberatory flue gas and/or diverted converter flue gas in lines 58, 61 or combined gas in line 12 is adjusted for optimum operation within the temperature range of about 150°–550° F by dilution air injection. The moisture may also be maintained within the range of 2 to 15 percent preferably 4–10 percent by a spray of water through lines 59 and 75. We prefer the use of water sprays since it eliminates dilution air volume as a contribution to the volume of gas which must be treated. The water spray also functions to cool the flue gas down to within the baghouse operational range, while at the same time reducing the volume of the gas to be treated. This permits a smaller baghouse at the same air-to-cloth ratio. Where, however, wet scrubbing, spray drying, or fluidized bed operation is being used, the gas need not be cooled, unless desired. For example, the fluidized bed can operate in the range of 650° to 1000° F with the sulfate/sulfite product blown over from the bed being collected in electrostatic precipitators of the hot side type.

For purposes of this example, the temperature of the diverted reverberatory flue gas 58 is held at 350° F ± 20° F. This is relatively cool operation, and as such represents moderate efficiency conditions. It should be understood that the Nahcolite ore reactivity in the baghouse increases with temperature and/or with decrease in the air-to-cloth ratio (superficial velocity). At higher temperatures, greater utilization of the Nahcolite Ore and $SO_x$ removal efficiency will be achieved. The diverted reverberatory flue gas in line 58 has an average volume of 285,000 SCFM and contains 63.7 tons per day of sulfur in the form of dust.

For this amount of gas, 486.2 tons of Nahcolite Ore 16 having an average assay of 75 percent sodium bicarbonate and approximately 2.3 percent magnesium carbonate, 5.6 percent calcium carbonate, and 17.1 percent other insolubles, is received by rail or truck transport 76 near the smelter and placed into a surge bin 77. This ore is conveyed by conveyor 78 to crushing module 79 and thence to grinding module 80. The crushing and grinding module reduces the ore as received from a size ranging from —½ to —1½ inch down to 90 percent — 200 mesh. There is a loss on the order of only 4.9 tons of Nahcolite Ore during crushing and grinding. The sodium bicarbonate of the ore is softer than other constituents, and tends to be moderately beneficiated by classification during grinding since the insoluble gangue material is harder to crush.

The ground ore is shown for convenience as divided into two streams, a pre-coat feed stream 81 and an injection feed stream 82. The ore is fed to hoppers 83, 84 by rotary feeders 85, 86 respectively.

The operation of the baghouse is as follows: Nahcolite Ore from hopper 83 is fed by means of rotary feeder 89 to air 87 inspirated by blower 88. This forms a precoat feed stream 90 containing 96.3 tons of Nahcolite Ore per day at an air volume of 3,800 SCFM. This stream precoats the bags with a thin layer of Nahcolite Ore prior to the bags being switched on stream to the flue gas 58, 61 or 12. After the bags are precoated with a thin layer on the order of 1/16 to ⅜ inch of Nahcolite Ore, the temperature-adjusted flue gas 91 is routed into the precoated bag chambers.

The remainder of the Nahcolite Ore in hopper 84 is fed into air stream 92 provided by blower 93 by means of rotary feeder 94 to form an injection feed stream of air containing Nahcolite Ore 95. This main feed stream contains 385 tons per day Nahcolite Ore at a volume of 23,800 SCFM which is then fed into the baghouse 96. The Nahcolite Ore in the main injection feed stream 95 is approximately 80 percent of the total, while the precoat feed is approximately 20 percent of the total, but the main stream may contain from 60–95 percent of the total Nahcolite Ore.

It should be understood that precoating is an optional step during operations since the bags after having been shaken may contain residual Nahcolite and not require precoating. Precoating is a preferred step during start-up of the baghouse operation. The Nahcolite ore in the injection feed stream may be slug or continuously fed into the air stream 92. By slug feed, we mean that the main injection feed amount of Nahcolite Ore (80 percent of the total in this example) is fed into the air stream 92' at a rate which prevents substantial "fall-out" (loss) of the Nahcolite Ore in the ducts so it is carried into the baghouse and is deposited on the bags. This can be done typically in 30 to 80 percent of the total time the bags are switched into the flue gas cleaning mode. In the alternative, the rotary feeder 94 can be operated at a rate just sufficient to feed the desired quantity of Nahcolite Ore (here 80 percent of the total) from hopper 84 continuously into flue gas 91, terminating the feed coincident with the completion of the cleaning cycle of baghouse 95. This is called continuous feeding.

After the bags have operated in the flue gas scrubbing portion of the cycle, typically 15 minutes to 1 hour, and more preferably on the order of 20 to 45 minutes, the bags are cycled to a shakedown (or bag cleaning) mode. This involves removing the cake of spent Nahcolite Ore (or other $SO_x$ sorbent) and reaction products from the bags, e.g. by mechanically shaking the bags so the cake falls down into the hopper 97. Another method of cleaning involes use of jets of high pressure air disposed on the clean side of the bags which blows the cake or dust off the exterior of the bag surface. Each bag compartment then continues on through the precoating mode, the onstream $SO_x$ scrubbing mode, and the bag cleaning mode, with appropriate pauses in between for switching, i.e., damper movement and pressure equalization.

The baghouse contains modular compartments each containing a plurality of bags. Excess capacity is built into the baghouse so that some of the bag compartments are off stream for repair or to synchronize the switching operations between modes. The bags are typically 1 foot bags, that is, bags having a diameter of 11½ inches and 33 feet long, to provide 100 sq ft of cloth surface. The bag fabric is typically fiberglass, but may be natural or synthetic fibers including metallic fibers, and may have commercial or conventional fabric treatments thereon. For example, we prefer to use a fiberglass bag having the fibers pretreated with one or more layers of graphite, silicone polymers, teflon or the like thereon to improve bag wear and lift. To prevent ripping of the bags, the bags are ordinarily slipped over a wire framework to prevent total collapse upon reverse air fow, upon start-up inflation, or deflation. To prevent bag blinding during operation at temperatures below the dewpoint, approximately 115° F, a plenum heater may be built into the bag compartments. In addition, while FIG. 3 shows the feeding of Nahcolite Ore some distance from the baghouse, it is understood that this preferably occurs in the bag chamber plenum. The bags may be any shape, such as round, double walled, or envelope shaped.

The Nahcolite Ore disposed on the bags serves the dual function of being a filter aid for removal of particulate matter, while at the same time being in position for contact with the $SO_x$ gases for reaction therewith to produce sodium sulfite and sulfate. The flue gas 91, after being cleaned, exhausts from the baghouse 95 as clean flue gas 60 or 60' from which approximately 90 percent of the $SO_x$ has been removed, using Nahcolite Ore in a stoichiometric ratio of about 1.2. The stoichiometric ratio may range from about 0.5 to 3, at an air-to-cloth ratio in the range of 1 to 4, with the preferred A/C ratio being around 2.0. Where desired, the clean flue gas 60 or 60' may be routed to the currently existing stacks 55, 55' (FIG. 2) or may be exhausted from the top of the baghouse directly to the atmosphere.

We have found that with the use of Nahcolite Ore, the presence of the bicarbonate form assists in retaining bag filter layer porosity. The Nahcolite Ore has the phenomenon of percolation. That is, approximately 37 percent of the weight of the Nahcolite Ore is lost due to removal of $H_2O$ and $CO_2$ from the bicarbonate as it reacts with the $SO_2$ and $SO_3$ to form sodium sulfite and sulfate. This 37 percent weight loss corresponds to an equivalent increase in porosity of the crystalline Nahcolite Ore on the bag and promotes continuing porosity of the filter cake as it builds up over the period of time in the $SO_x$ scrubbing mode.

We have found that under the smelter type conditions, that is, very high $SO_x$ concentrations on the order of up to 25,000 parts per million, as contrasted to low $SO_x$ values of 600–3,000 parts per million present in power plant operating conditions, the predominant form of sodium salt is sodium sulfite rather than sodium sulfate. While both species are present, the sodium sulfite predominates, and this predominance appears to be relatively independent of the $SO_x$ concentration. A typical ratio is approximately 70 to 90 percent of the total sodium sulfur oxide salts produced being sulfite while the remaining 10 to 30 percent are sodium sulfate.

The spent baghouse filter cake product in hoppers 97 is removed via conveyor system 98 and contains approximately 412.7 tons of material of which 61.5 percent is the mixed sodium sulfate/sulfite, 9.3 percent is unreacted Nahcolite Ore converted to sodium carbonate, 2.7 percent is unreacted magnesium carbonate and 6.5 percent is unreacted calcium carbonate, with the balance of 20 percent being uncreacted insolubles. This spent sodium sulfite/sulfate baghouse cake material is then forwarded to bin 99 and transported by conveyor truck, rail or pipeline to the next phase of the overall process, the $Fe^{+2}$ stripping operation 18 described in detail in connection with FIG. 4.

In the case of wet $SO_x$ scrubbing, the pipeline mode of transport may prove to be the simplest. In addition, little or no transport may be required where the $Fe^{+2}$ stripping operation is carried on adjacent to the smelting operation. Normally, however, the smelter is disposed some distance from the ore mining and dump location and will be required to be transported. Rail transport would be the most feasible since normal smelter and mine operations require rail transport of the ore from the mine area to the smelter area, and the empty cars deadheading back can provide transport facilities for the spent baghouse filter cake product containing sodium sulfite/sulfate waste material.

Turning now to FIG. 4, the spent sodium sulfite/sulfate waste material is received in bin 99' which may be the same or different from the bin 99 adjacent to the baghouse. A rotary feeder 100 supplies the spent baghouse filter cake product at the rate of 412.7 tons per day to a mixer 140 to which are added 269 gallons per minute of water via line 32. This mixture is agitated by mixing means 101 and 102 to thoroughly dissolve the soluble sodium salt components. AT the same time, a degree of aeration is introduced, or optionally may be added, to assist in converting sulfite to sulfate. The solution is sufficiently low in ferric ion so that premature reaction is avoided. The pulp mixture is withdrawn from mixing tank 140 via pump 103. The pulp is pumped through line 104 at the rate of 299 gallons per minute. The pulp contains 5.9 percent by weight undissolved solids, principally ore gangue and collected fly ash, in the amount of 120.5 tons per day. The solute consists of sodium sulfur oxide salts, considered as sodium sulfate, in the amount of 253.8 tons per day, and residual sodium carbonate in the amount of 38.4 tons per day. This is passed to thickener 105 from which insolubles-containing underflow 106 is withdrawn by pump 107 at the rate of 26 gallons per minute, and passed to a landfill disposal via line 108, or passed to the $Fe^{+2}$ stripping pond 109 via line 110. Where the underflow is forwarded to disposal 108, it may first be passed through a vacuum filter or centrifuge to remove residual solute and solvent (water) therefrom. Where necessary, the insoluble waste material may be rinsed, and the rinse water recycled to mixer 140 or forwarded to the $Fe^{+2}$ stripping pond 109 (not shown). Polishing by ion exchange may be employed, as disclosed in our copending application Ser. No. 411,365.

We prefer to forward the underflow in line 110 to the $Fe^{+2}$ stripping pond 109. The underflow 110 is 50 percent by weight solids slurry or pulp containing 120.5 tons of undissolved solids, and a dissolved solute containing 16.0 tons of sodium sulfur oxides (considered for simplicity as sodium sulfate), with residual sodium carbonate in the amount of 2.4 tons. This is inlet to the $Fe^{+2}$ stripping pond by floating lines 111, 112 and 113 which contain valves as shown. These lines may be of plastic or metal, and are arranged for relatively even distribution throughout the pond. The underflow 110 is distributed at the surface of the head end of pond 109 to allow accumulation of solids starting at the inlet (head) and progressing toward the dam (discharge) end 139. Also the $CaCO_3$ and $MgCO_3$ in the underflow tailings, by being discharged at the surface, will allow time for their reaction with $H_2SO_4$ to produce $CaSO_4$ and $MgSO_4$. This also allows for production of $CO_2$ continuously through the pond solution column. Both $CO_2$ and hydrated $MgSO_4$ are nutrients for the bacteria.

The iron in line 20 is preferred to be in the ferric ion form by the time it is delivered to the reactor (pond 109). Where, however, the iron is available primarily or only as $Fe^\circ$ or ferrous ion, the process contemplates both abiotic iron oxidation and biotic oxidation with one or more bacteria of the genus Thiobacillus (ferrooxidans, thiooxidans, concretivorous, neopolitanus, or thioparus), the genus Ferribacillus (such as ferrooxidans), and acid-tolerant filamentous iron bacterium of the genus Metallogenium. The abiotic ferrous iron oxidation is directly dependent on the pH above 4.5, indirectly pH dependent between 3.5 and 4.5 and is relatively constant below a pH of 3.5. In general, abiotic ferrous iron oxidation is slower at a lower pH. For example, abiotic oxidation is approximately 8,200 times slower at a pH of 3.5 than at a pH of 5.5.

At the same time, the overflow liquor 114 from thickener 105 is passed via pump 115 at the rate of 273 gallons per minute to a distribution manifold 116, from whence the liquor is distributed in a series of lines into the pond 109. The liquor comprises a dissolved solute containing 237.8 tons per day of sodium sulfur oxides (considered for simplicity as sodium sulfate), and 30 tons per day residual sodium carbonate.

After passing through valves 117 through 120, the liquor is mixed with compressed air supplied by compressor 121, surge tank and distribution receiver 122, valves 123 through 126 and distribution lines 127 through 130.

The aerated liquor mixture is then passed into the pond via submerged perforated plastic pipes 131 through 134. These pipes are disposed suspended between the bottom on the pond 135 and the water line 136 by means of buoys 137 and lines 138. The line length is adjusted to retain the pipes above the base of the pond so the pipe does not get submerged in the precipitate sediments which are formed. The overflow liquor $Na_2SO_3/SO_4/Co_3$ solution is introduced near the floor of the pond since stronger concentrations of ferric sulfate are present at depth. This is due to the greater microbial activity where less sunlight penetrates. Ferrous sulfate introduced at the upper level through lines 19 and 20 clouds out much of the sunlight. Normally, sunlight inhibits, but does not destroy, the bacteria to depths of about 2 feet in the absence of radiation absorbers, such as ferrous sulfate. The effect of lack of oxygen and/or nutrients is greater than that of sunlight. Bacteria should not be inhibited below pond depths of about 2–4 feet. The pond dam or dike 139 may be periodically raised as the pond gets filled. The compressed air 127–130 permits both a stirring and aeration action to provide for further oxidation of sodium sulfite and ferrous ion with the aid of the bacteria, and distribution of the reactants.

An alternative mode of operation is to pump overflow liquor 114 directly through open valve 117 while compressed air valve 126 is closed. Simultaneously valves 118, 120 and 124 may be closed and valves 119, 123 and 125 open. This distributes the Na sulfate/sulfite liquor in one or more lines 131, 133d whfile only compressed air is being pumped in another portion of the piping layout (132, 134) for a specified time period. This operation is sequential feed/aeration rather than the simultaneous aerated feed described above.

In addition, excess sulfuric acid from the acid plant 7 shown in FIG. 1 is provided by line 19 to the pond, while ferrous ion-rich barren liquor tails from the cement copper operations (shown in more detail in FIG. 5) is provided by line 20. In the alternative, the sulfite/sulfate liquor in line 114 may be mixed with either or both of the excess sulfuric acid and/or ferrous ion-rich barren liquor in lines 19 and 20, respectively, and provided to the submerged perforated plastic pipes 131–134 via a manifold system analogous to that of 116 (not shown).

The pond is maintained at a temperature in the range of from 50° to 300° F, more preferably in the range of from about 75° to 180° F. The most preferred temperature is in the range of approximately 130° to 150° F. The pH of the pond is maintained below about 4.0, and preferably in the range of from 0 to 3.5, with the most preferred range being 1.0 to 3.0. A convenient method of maintaining the pond temperature is to sparge a side stream of hot convertor or reverberatory furnace flue gas bled from any one or more of lines 47, 54', 56', 71 or 73 (FIG. 2) into the pond (not shown). In the alternative, the hot flue gas may be mixed with the liquor 114, by a manifold-compressing system of the type used in place of or in addition to the compressed air. The hot flue gas provides heat requirements, and under the acidic conditions of the pond some of the $SO_2$ and $SO_3$ is scrubbed and retained in the pond in the form of sulfurous or sulfuric acid. Although not absolutely required, residual sodium sulfite is generally all converted to sulfate under the pond conditions. Barren liquor, being warm, about 80–120° F, also contributes heat to the pond.

At the above described conditions, the sodium sulfate combines with ferric sulfate values to form double salts which coprecipitate as a granular, relatively water insoluble crystalline precipitate. The double salts are sodium ferric hydroxy disulfates, and where sulfites are present in solution may include the corresponding sulfite salts. The major sulfate double salts are essentially indistinguishable from natural minerals Sideronatrite, Metasideronatrite, and Natrojarosite, but may also inclue Ferrinatrite. Where lead and silver values may be present as ionic species in solution, Argentojarosite, Plumbojarosite and the like may be included. The major sulfite analogs are Depegite, Rosarite, and Iriite.

As shown schematically in FIG. 1 and in more detail in FIG. 4, the surface level of the $Fe^{+2}$ stripping pond is maintained by withdrawing relatively iron-free leaching solution via line 23 to the leach dumping operations. In the pond 109, 74.9 tons per day of sulfuric acid are consumed by the barren liquor 20 and sodium sulfate liquor 114, to produce 784.5 tons per day of the coprecipitated double salts $M_vNa_wFe_x(SO_u)_y(OH)_z.nH_2O$, 52.2 tons of calcium sulfate, and 15.8 tons of magnesium sulfate. The equivalent amount of ferric sulfate provided in lines 19 and 20 per 24-hours of operation is 326.3 tons. In the above formula $v$ is 0–6, $w$ is 1–5, $x$ is 0–6, $u$ is 3 and/or 4, $y$ is 1–5, $z$ is 0–12 and $n$ is 0–20. M is selected from an authigenic metal selected from cobalt, magnesium, manganese, boron, titanium, calcium, copper, lead, zinc, arsenic, molybdenum, tin, antimony, selenium, gallium, vanadium, nickel, berrylium, zirconium, silver, tellurium, bismuth, mercury, strontium, barium, chromium, platinum, palladium, aluminum, uranium or other metals present in the barren liquor or $SO_x$ air pullution control waste.

The end product may vary depending on the pH of the reaction tank or ponds. For example, Sideronatrite, $Na_2Fe(SO_4)_2OH.3H_2O$ and/or Metasideronatrite, $Na_4$-$Fe_2(SO_4)_4(OH)_2.3H_2O$, may be produced at a pH of below about 2.0, while Natrojarosite, $NaFe_3(SO_4)$-$_2(OH)_6$, may be produced at a pH below about 4. Depegite $Na_5Fe_4(SO_3)_5(SO_4)_2(OH)_3.3H_2O$, Rosarite, $Na_2$-$Fe(SO_3)_2OH.3H_2O$, and Iriite $NaFe_3(SO_3)_2(OH)_6$ may be produced at a pH between about 2.2 and 5.5.

The empirical formula of Depegite closely approximates $Na_5Fe_4(SO_3)_5(SO_4)_2(OH)_3.3H_2O$. Upon further analysis, Depegite is thought to be a cocrystallizate or mix of about 30 weight percent Sideronatrite, $Na_2Fe(-SO_4)_2OH.3H_2O$, and two new compounds, 30 percent Rosarite, $Na_2Fe(SO_3)_2OH.3H_2O$, and 40 percent Iriite, $NaFe_3SO_3)_2(OH)_6$. Rosarite and Iriite appear to be disulfite analogs of Sideronatrite and Natrojarosite, respectively.

The presence of other metal cations, such as ions of Cu, Mg, Al, Pb, Ag, Zn and the like naturally present in the waste waters, cake or liquors do not interfere. Indeed, such metallic ions can be scavenged by coprecipitating with the above compounds as, for example, Argentojarsite, $AgFe_3(SO_4)_2(OH)_6$, Beaverite, $Pb(Cu, Fe, Al)_3(SO_4)_2(OH)_6$, Plumbojarosite, $PbFe_6(-SO_4)_4(OH)_{12}$, Tychite, $Na_6Mg_2(SO_4)(CO_{34}$, Natroalunite, $NaAl_3(SO_4)_2(OH)_6$, and the like.

The solubility at room temperature of the end product Sideronatrite is 0.16 g/liter based on the iron analysis and 0.55 g/l based on sodium analysis. The solubility of the end product Natrojarosite is 0.02 g/l based on the iron analysis and 0.37 g/l based on sodium. The iron analysis is considered more reliable because of the difficulty of washing entrained sodium ion from the precipitate. These compare favorably to the following reported solubilities:

Table III

| Component | Relative Solubilities |
|---|---|
| | Solubility and Conditions |
| Anhydrous $Na_2SO_4$ | |
| Monoclinic columnar | 488 g/l at 40° C |
| Rhombic (Thenardite) | 427 g/l at 100° C; 47.6 g/l at 0° C |
| $Na_2SO_4 \cdot 10H_2O$ (Glaubers salt) | 110 g/l at 0° C |
| $Na_2SO_4 \cdot 7H_2O$ | 195 g/l at 0° C |
| $Na_2SO_3 \cdot 7H_2O$ | 328 g/l at 0° C |
| $Na_2SO_3$ anhydrous | 125.4 g/l at 0° C |
| $CaSO_4 \cdot 2H_2O$ | 2.3 g/l at R.T. |
| $CaSO_3 \cdot 2H_2O$ | .043 g/l at R.T. |
| $MgSO_4 \cdot 7H_2O$ | 724 g/l at 0° C |
| Sideronatrite (based on Fe) | .16 g/l at R.T. |
| Natrojarosite (based on Fe) | .02 g/l at R.T. |
| Natroalunite (based on Al) | 0.16 g/l at R.T. |

By comparing the overall reactions for the production of Natrojarosite:

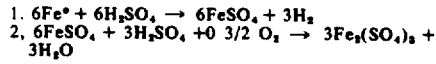

1. $6Fe^\circ + 6H_2SO_4 \rightarrow 6FeSO_4 + 3H_2$
2. $6FeSO_4 + 3H_2SO_4 + 3/2\ O_2 \rightarrow 3Fe_2(SO_4)_3 + 3H_2O$

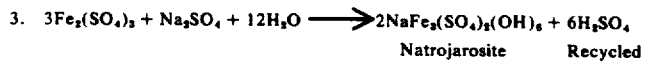

3. $3Fe_2(SO_4)_3 + Na_2SO_4 + 12H_2O \longrightarrow 2NaFe_3(SO_4)_2(OH)_6 + 6H_2SO_4$ Natrojarosite    Recycled with the overall reactions for the production of Sideronatrite:

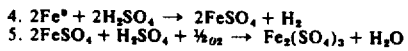

4. $2Fe^\circ + 2H_2SO_4 \rightarrow 2FeSO_4 + H_2$
5. $2FeSO_4 + H_2SO_4 + \frac{1}{2}O_2 \rightarrow Fe_2(SO_4)_3 + H_2O$

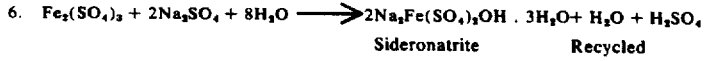

6. $Fe_2(SO_4)_3 + 2Na_2SO_4 + 8H_2O \longrightarrow 2Na_2Fe(SO_4)_2OH \cdot 3H_2O + H_2O + H_2SO_4$ Sideronatrite    Recycled it can be seen why we prefer the production of Natrojarosite in the $Fe^{+2}$ stripping pond (or reaction tank as the case may be). This is because the overall can factor (the ratio of elemental iron required to sodium ion removed), the acid balance (the amount of sulfuric acid produced minus the amount required), the acid factor (the ratio of sulfuric acid required to elemental iron required), and the iron factor (the ratio of elemental iron required to sodium sulfate disposed of), are each lower for Sideronatrite than for Natrojarosite. In Natrojarosite, the can factor is 3 whereas for Sideronatrite the factor is 0.5, with the lower the factor number the less stripping of $Fe^{116\ 2}$ in the pond or tank operation. Only two moles of acid are used up in the production of Sideronatrite as compared to three moles used in the production of Natrojarosite. Likewise, the acid factor in Sideronatrite is 1.0 whereas the factor for Natrojarosite is 3.0. The iron factor of Natrojarosite is 6 whereas for Sideronatrite the factor is only 1. Both the acid factor and iron factor (twice the can factor) give a feel for how much barren liquor can be stripped and waste sulfuric acid disposed of by the waste sodium sulfate from the $SO_x$ flue gas scrubbing operation. Of course, the balance of available materials (acid, barren liquor, waste $Na_2SO_4$) must be considered. Thus, where there is little barren liquor, or its $Fe^{+2}$ concentration is low, the production of Sideronatrite may be preferred. Likewise, a mixed precipitate can be produced by the materials balance of the smelter and $SO_x$ scrubbing operation shown above.

Figure 5:
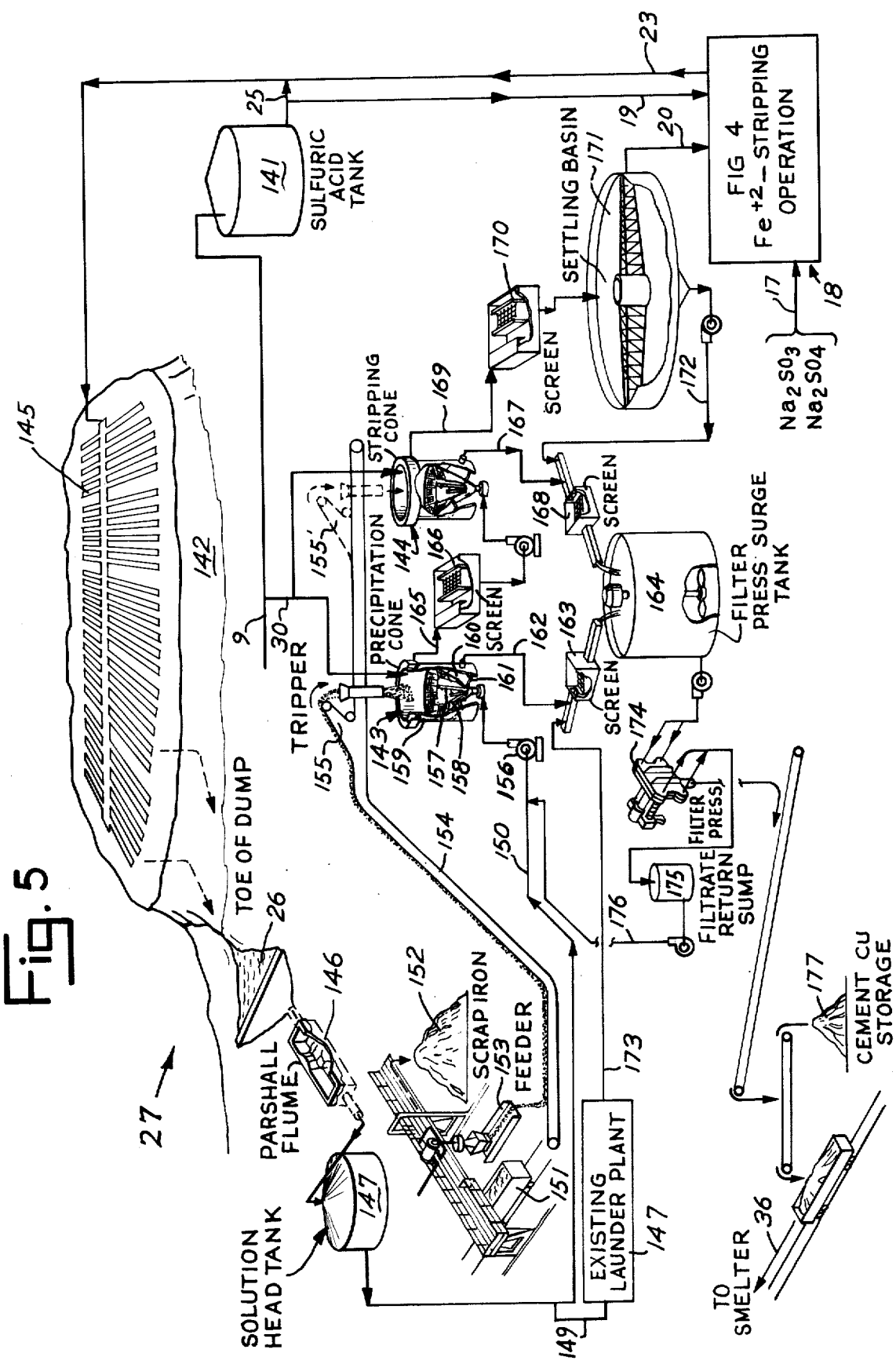
FIG. 5 is a flowsheet of a typical cement-copper operation as it is integrated with the $Fe^{+2}$ stripping operation set forth in FIG. 4.

FIG. 5 illustrates the use of the $Fe^{+2}$ stripped liquor 23 from the pond 109 of the stripping operation 18 in the leaching and cement copper operation 27. To the supernatant $Fe^{+2}$ stripped liquor 23 is added sulfuric acid 25 to adjust the pH between 2–3 when necessary. It may not be necessary to adjust pH since the stripping pond reaction can be maintained in that range. The sulfuric acid conveniently is brought from plant 7 (FIG. 1) or other source via line 9 to storage tank 141. A portion of the acid may be added directly to the dump 142 via line 25 where desired, e.g. upon starting dump operation. Another portion 30 may be directed to the precipitation cone 143 and stripping cone 144, if needed.

The acidic leach solution is distributed over dump 142 by pipes or ditches 145. The acidic solution dissolves copper while leaching slowly through the dump ore and collects at the toe as a pregnant solution rich in $Cu^{+2}$ ion, typically from 0.75–7.0 g./l. The sump temperature rises, in part by bacterial action, and may range from 90°–130° F. The pregnant liquor pH varies from 1.4–3.5, ferrous iron from 0 to 3.60 g/l, ferric iron from 0.05 to 3.0 g/l and free acid from 0.04 to 7.5 g/l. Copper recovery averages well above 90 percent. When excess ferrous iron is present in the leach solution, or the pH gets too high in the dump, ferrous hydroxide, ferric hydroxide and Goethite (FeOOH) form in the dump plugging it and reduces the efficiency of leaching. The ferrous and ferric iron comes principally from the use of scrap iron in the cement copper operation. Thus the $Fe^{+2}$ stripping involved in this invention reduces ferrous and ferric ion input into the dump and the plugging thereby.

The pregnant liquor 26 is passed through a Parshall flume 146 and retained in a solution head tank 147 before being passed to a launder plant 157 or cones 143, 144 via lines 149 and 150, respectively. Scrap iron is brought in by rail 151 and stockpiled at 152. The scrap iron is then feed as required by feeder 153 to conveyor 154 which employes a traveling tripper 155 to feed precipitation cone 143 and stripping cone 144 (position 155', as shown in phantom). The copper bearing, acidic pregnant solution 150 is injected into the mass of iron in the cone, via pump 156 and nozzle-bearing manifold 157 in the apex of cone 158 disposed in holding tank 159. There the elemental iron, $Fe^0$, is converted to $Fe^{+2}$ while $Cu^{+2}$ is converted to $Cu^0$. Injection of the pregnant solution has the effect of rapidly precipitating copper, while removing metallic copper from the iron surface to continuosuly expose clean fresh iron. The copper precipitate circulates upward out of the stainless steel screen of the cone into a reduced velocity zone 160 of the holding tank 159. The copper precipitate then settle down onto the sloped false bottom 161 of tank 159. The copper can be discharged intermittently or continuously via pipe 162 through a screen 163 to a surge tank 164.

The overflow partly-precipitated solution is pumped via line 165 and screen 166 to a second cone 144 in series with cone 143. This cone operates similarly to cone 143 and serves to further strip $Cu^{+2}$ values from the solution. Copper precipitate is likewise passed via pipe 167 through screen 168 to surge tank 164.

The overflow 169 is a barren solution which is screened at 170 and passed to setting basin 171. The pH of this barren solution ranges from 2.4 to 4.4, the copper ranges from 0.01 to 0.36 g/l, ferrous iron varies from 1.02 to 8.93 g/l, ferric iron varies from 0 to 0.30 g/l and free acid from 0.05 to 0.30 g/l.

The underflow 172 contains precipitate Cu values which are pumped to surge tank 164. The settling basin overflow 20 is high in $Fe^{+2}$ which is removed in the stripping operation 18 described above, and the $Fe^{+2}$-free liquor is then recycled via line 23 to leach dump 142.

Cu precipitate from any existing launder plants 147 is also forwarded to the surge tank 164 via line 173 and screen 163. The combined Cu precipitate slurry is pumped to filer press 174, with the filtrate, after collection in sump 175, being returned to the precipitation cones via line 176. The precipitate from press 174 is 90–95 percent Cu and is conveyed to storage 177, and thence, periodically, to the smelter as Cu precipitate feed 36 (see FIG. 2).

Figure 6:
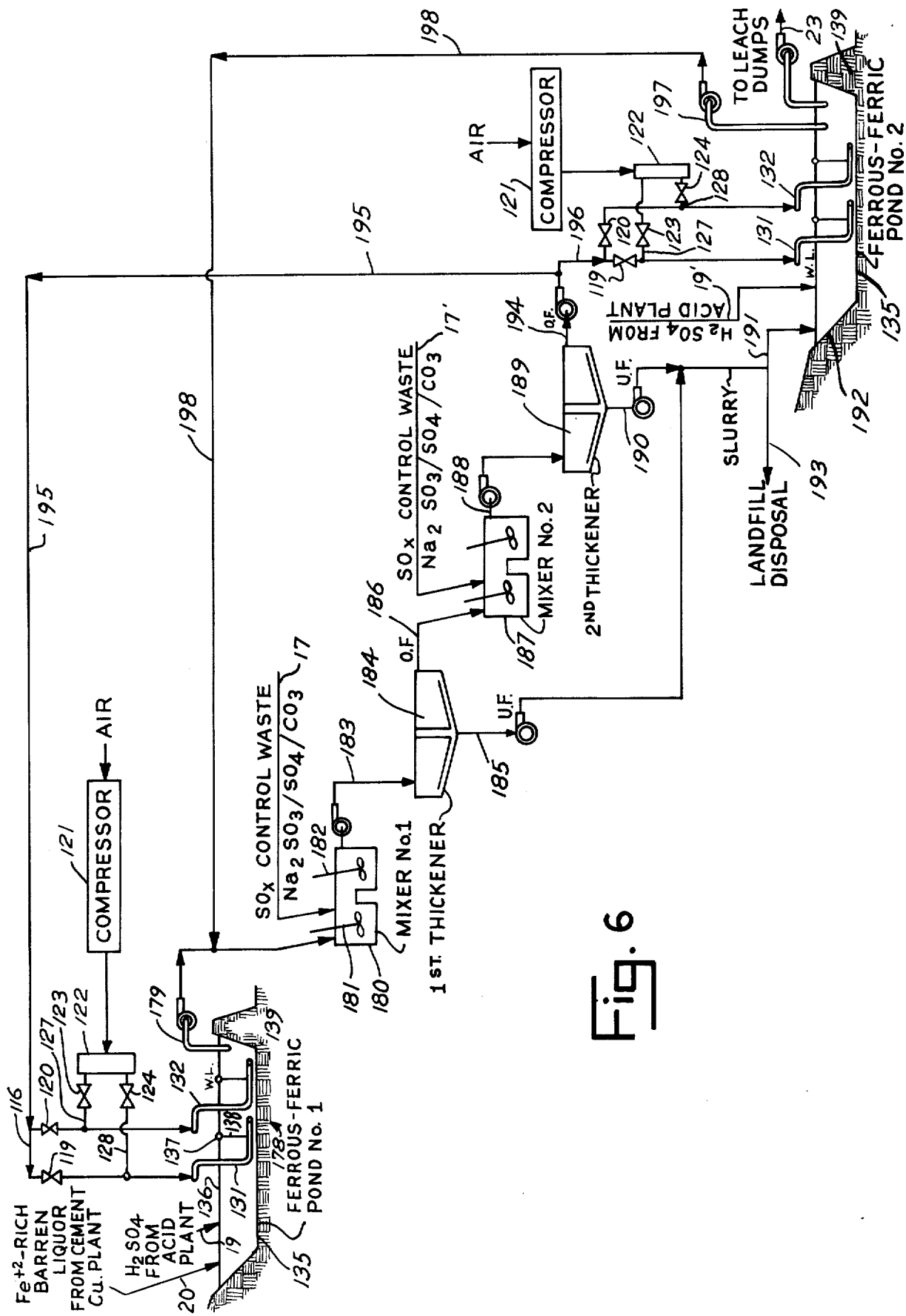
FIG. 6 is a flowsheet illustrating another embodiment of the ferrous stripping operation.

The effect of the presence of some residual $Na_2CO_3$ in the $SO_x$ emissions control wastes is now described, principally with respect to FIG. 6, which it should be understood also applies to FIG. 5. Generally, the $Na_2CO_3$ functions to provide the vital nutrient $CO_2$ for bacteria which oxidize $Fe^{+2}$ to be $Fe^{+3}$ in the pond. It also reacts with $H_2SO_4$ in the pond, providing added capacity for disposal of waste acid. In this aspect it simultaneously produces $Na_2SO_4$, available to strip more $Fe^{+2}$ from the barren liquor to form SFH. Thus, overall, $FeSO_4$ is oxidized to $Fe_2(SO_4)_3$ with oxygen, $H_2SO_4$ and bacteria, in the pond (or reactions tanks), and $Fe_2(SO_4)_3$ reacts with waste $Na_2SO_4$ to form water insoluble sodium ferric hydroxy disulfates and $H_2SO_4$. As shown by the reactions above, $H_2SO_4$ is generated in the reaction. Some of the $CaCO_3$ and $MgCO_3$ reacts with $H_2SO_4$ to form water insoluble $CaSO_4$, and some soluble hydrated $MgSO_4$, but the latter is a bacterial nutrient. $Na_2CO_3$ is available in the scrubbing waste to react with $H_2SO_4$, producing bacterial nutrient $CO_2$, and added $Na_2SO_4$ for $Fe^{+2}$ stripping. The simultaneous presence of the ionic species mentioned, under the pond conditions, may lead to precipitation of insoluble compound $Na_6Mg_2(SO_4)(CO_3)_4$ analogous to the natural compound, Tychite.

In the embodiment of FIG. 6, barren liquor 20 and $H_2SO_4$ 19 are introduced into a first poing 178 where bacterial action assist in converting ferrous to ferric ion. The overflow 179, rich in $Fe^{+3}$ ion is pumped to a first mixer 180 which contains agitation means 181, 182. A first portion of the $SO_x$ control wastes 17 from the smelter are introduced into the mixer and SFH, $CO_2$, $CaSO_4$, hydrated $MgSO_4$ and Tychite commences to form as described above. The mixer overflow 183 is pumped to a first thickener 184 where the reactions continue and precipitated underflow solids 185 are withdrawn.

The overflow 186 from first thickener 184 is passed to a second mixer 187, to which is added a second portion of $SO_x$ control sodium wastes 17' and reaction proceeds as in mixer 181. Overflow 188 is pumped to a second thickener 189, from which underflow reaction precipitate slurry 190 is withdrawn, combined with precipitate slurry 185 and forwarded via line 191 to a second pond 192 for disposal, or to landfill disposal via 193. The slurry 193 may be rinsed and dewatered as above described. Rinse water may be polished or recycled to the ponds, mixers or thickeners as desired.

Overflow 194, containing $CO_2$, unreacted $Na_2SO_4$, and $Fe^{+3}$ is divided and a portion recycled via line 195 to the first pond 178 where it is distributed, along with compressed air by compressor, manifold, valve and buoyed piping system 119–124, 127, 128, 131 and 132, as described above in detail. The other portion of overflow 194 is pumped to the second pond 192 via line 196 and is distributed as with portion 195 in the first pond 178. A second portion of sulfuric acid 19' is added to second pond 192 which, under the bacteria, $CO_2$ and $O_2$ conditions converts $Fe^{+2}$ to $Fe^{+3}$, and some additional insoluble precipitates form. A portion of the supernatant 197 from the second pond, rich in $Fe^{+3}$[3], is recycled via line 198 back to the first mixer 180. The recycles 195, 198 help ensure efficient $FE^{+2}$ stripping. The stripped liquor 23 is withdrawn from poind 192 and forwarded to the leach dump 142 as above described with respect to FIGS. 4 and 5.

It should be understood that insoluble gangue in wastes 17 and 17' may first be separated from the solute as in FIG. 4 and disposed directly via line 193 or forwarded to ponds 178, 192 without passing through the mixers and thickeners. Likewise, the two ponds shown may be two reaction tanks, or different portions of a single large pond. The $Fe^{+2}$ content of liquor 23 is preferably monitored, and flow rates adjusted throughout the stripping system shown in FIGS. 4 and 6 to achieve the desired reduction in $Fe^{+2}$. Whereas input barren liquor 20 contains typicall 1.02 to 8.93 g/l $Fe^{+2}$ and 0 to 0.30 g/l $Fe^{+3}$, the stripped liquor 23 would contain 0.01 to 0.5 g/l $Fe^{+2}$ and 0.1 to 1.0 g/l $Fe^{+3}$.

EXAMPLES 1–15

By way of specific examples, Sideronatrite, Metasideronatrite, Natrojarosite and Natroalunite have each been prepared within the temperature and pH conditions above-described employing sodium sulfate solutions, such as from scrubber wastes or dissolved baghouse sulfate cake, ferric sulfate solution and sulfuric acid solutions. As shown below in Table III, good yield is obtained at the conditions described above herein, at temperatures on the order of below about 130° F.

Table IV

| Example No. | Solution Components (as Ions) Grams/Liter | | | Moles/Liter | | | Molar Ratio Na/Fe | pH | Precipitant Formation Precipitate Formed |
|---|---|---|---|---|---|---|---|---|---|
| | $Fe^{+3}$ | $Na^{+1}$ | $SO_4^{-2}$ | $Fe^{+3}$ | $Na^{+1}$ | $SO_4^{-2}$ | | | |
| 1. | 9.30 | 3.93 | 32.02 | 0.167 | 0.167 | 0.333 | 1.0 | 1.85 | Natrojarosite |
| 2. | 7.97 | 5.06 | 30.88 | 0.143 | 0.214 | 0.321 | 1.5 | 1.95 | Natrojarosite |
| 3. | 6.98 | 5.90 | 30.02 | 0.125 | 0.250 | 0.313 | 2.0 | 2.03 | Natrojarosite |
| 4. | 4.65 | 7.87 | 28.02 | 0.083 | 0.333 | 0.292 | 4.0 | 2.20 | Natrojarosite |
| 5. | 4.65 | 10.23 | 28.03 | 0.083 | 0.454 | 0.292 | 5.33 | 2.20 | Natrojarosite |
| 6. | 35.46 | 129.56 | 362.06 | 0.635 | 5.63 | 3.769 | 8.86 | 1.55 | Sideronatrite |
| 7. | 46.50 | 78.67 | 280.18 | 0.083 | 3.33 | 2.917 | 4.0 | 1.0 | Sideronatrite & Metasideronatrite |
| 8. | 46.50 | 78.67 | 280.18 | 0.083 | 3.33 | 2.917 | 4.0 | 0.0 | Ferrinatrite |
| 9. | 4.65 | 50.35 | 114.47 | 0.083 | 2.133 | 1.192 | 25.60 | 2.60 | Sideronatrite & Metasideronatrite |
| 10. | 4.65 | 25.17 | 63.24 | 0.083 | 1.067 | 0.658 | 12.80 | 2.80 | Natrojarosite & Goethite[1] |
| 11. | 4.65 | 50.35 | 114.47 | 0.083 | 2.133 | 1.192 | 25.60 | 2.80 | Natrojarosite & Goethite[1] |
| 12. | 4.65 | 50.35 | 114.47 | 0.083 | 2.133 | 1.192 | 25.60 | 2.55 | Natrojarosite/ Sideronatrite |
| 13. | 4.65 | 50.35 | 114.47 | 0.083 | 2.133 | 1.192 | 25.60 | 2.70 | Sideronatrite/ Natrojarosite |
| 14. | 4.65 | 50.35 | 114.47 | 0.083 | 2.133 | 1.192 | 25.60 | 2.5 | Sideronatrite |
| 15. | 22.50[2] | 78.67 | 250.2 | 0.083[2] | 3.33 | 2.92 | 4.0[2] | 3.51 | Natroalunite |

[1] FeOOH
[2] Aluminum in this example rather than iron to show production of Natroalunite, $NaAl_3(SO_4)_2(OH)_6$ In the above examples of precipitate formation conditions, Examples 1–4 represent typical leach liquor concentrations of ferric iron and sulfate, such as from pyrites dump or copper leach dump spent liquor. Example 5 represents typical concentrations of sodium and sulfur oxides (sulfate/sulfite), for example, from the Nahcolite Ore dry baghouse injection process described above. Example 6 confirms formation of Sideronatrite at very high iron, sodium, and sulfate concentrations. Examples 7 and 8 represent typical waste steel pickling liquors as a source of ferric iron and sulfate from which Sideronatrite and Metasideronatrite may be formed. Example 9 approximates concentrations of wastes from $Na_2CO_3$ or sulfite/bisulfite $SO_x$ emissions control wet scrubbing process. Examples 15 shows production of Natroalunite when aluminum is present.

EXAMPLE 16

Working Example of Process As Applicable to Actual Smelter Operations

In addition to the exemplary process quantities given in the description and specific Examples 1–15 above, the following summarizes the overall operation applied to a practical situation by way of a working example. Taking The Garfield, Utah smelter operation as representative of smelter operations 3 (See FIGS. 1 and 2) the parameters and results for this exercise are:

1) Garfield Copper Smelter (a) Smelter Capacity at 1,000,000 TPY concentrate;
(b) Avg. U.S.A. % S in Conc. = 31%

-continued

1) Garfield Copper Smelter

Avg. U.S.A. % Cu in Conc. = 26%
  (c) Total Sulfur = 1,000,000 TPY × 31% = 310,000 TPY;
      Total Copper = 1,000,000 TPY × 26% = 260,000 TPY.

The parameters for the $SO_x$ scrubbing portion of the process, using the dry Nahcolite Ore baghouse injection process to remove 75 percent of the $SO_x$ are:

2) Nahcolite Process (a) Nahcolite Ore Assay at 70% $NaHCO_3$
      (equivalent to 25.8% $Na_2O$);
      $CaCO_3$ at 6.7%;
      $MgCO_3$ at 2.8%
  (b) Inlet Temp. at 400° F;
  (c) Bag Filter Ratio at 3.0;
  (d) $SO_x$ Removal Efficiency at 75% at S.R. of 1.0;
  (e) Ratio lbs. Nahcolite Ore to 1.0 lb. Sulfur
      $= \dfrac{5.250}{70\% \times 75\%} = 10.0$ lb. Nahcolite Ore to 1.0 lb. Sulfur A smelter typically has an acid plant 7 (FIG. 1) which can tap a variable amount of flue gas from the converters, or be designed to take at full load a predetermined amount to the flue gases, depending on prevailing stack emission regulations or market conditions for acid.

Thus, we consider three cases for consideration of the distribution of the flue gas, in terms of total sulfur therein, between the acid plant 7 and the scrubbing 13:

| Sulfur Destination | % Sulfur Distribution | | |
|---|---|---|---|
| | Case I | Case II | Case III |
| to Nahcolite scrubbing | 20.0% | 30.0% | 40.0% |
| to Smelter Acid Plant | 70.0 | 60.0 | 50.0 |
| Emission to Atmosphere | 10.0 | 10.0 | 10.0 |
| Totals | 100.0% | 100.0% | 100.0% |

| Sulfur Destination | Tons Sulfur Distribution (Annual Tons) | | |
|---|---|---|---|
| | Case I | Case II | Case III |
| to Nahcolite scrubbing | 62,000 T. | 93,000 T. | 124,000 T. |
| to Smelter Acid Plant | 217,000 | 186,000 | 155,000 |
| Emission to Atmosphere | 31,000 | 31,000 | 31,000 |
| Totals | 310,000 T. | 310,000 T. | 310,000 T. |

It should be understood that 40 percent of the sulfur to the $SO_x$ scrubbing will be greater than 40 percent of the total gas since the acid plant will tap only the richer converter gas. Thus, the $SO_x$ scrubbing system may handle up to 100 percent of the reverb gas, alone or additionally with some of the converter off gases.

For the above three cases, the annual requirements in tons are as follows:

3. Statistics for Nahcolite Scrubbing and $Fe^{+2}$ Stripping Operations in Annual Tons

| Product | Factor | Case I | Case II | Case III |
|---|---|---|---|---|
| (a) Nahcolite Ore (R.O.M.) | 10.0[1] | 620,000 T. | 930,000 T. | 1,240,000 T. |
| (b) $Na_2O$ - Nah.Ore | 0.258[2] | 160,000 T. | 240,000 T. | 320,000 T. |
| (c) Sulfur Removed | | 62,000 T. | 93,000 T. | 124,000 T. |
| (d) $FeSO_4$ Removed | 2.45[3] | 392,000 T. | 588,000 T. | 784,000 T. |
| (e) Solids Precipitated | | | | |
| (1) SFH as $Na_2Fe(SO_4)_2$(OH) . $3H_2O$ | 5.89[2] | 942,400 T. | 1,413,600 T. | 1,884,800 T. |
| (2) $CaSO_4$ | 0.0843[4] | 52,300 T. | 78,400 | 104,500 |
| Totals | | 994,700 T. | 1,492,000 T. | 1,989,300 T. |
| (f) $H_2SO_4$ Generated | 0.793[5] | 126,900 T. | 190,300 T. | 253,800 T. |
| (g) $H_2SO_4$ Consumed | | | | |
| (1) $CaCO_3$ | 0.0608[4] | 37,700 T. | 56,500 T. | 74,500 T. |
| (2) $MgCO_3$ | 0.0327[6] | 20,300 | 30,400 | 40,500 |
| (3) $Na_2CO_3$ | 0.1021[7] | 63,300 | 95,000 | 126,600 |
| Totals[8] | | 121,300 T. | 181,900 T. | 242,500 T. |

Notes:
[1]Factor lb-Nah/lbs-S 10.0 × 62,000 T-Sulfur = 620,000 TPY
[2]75% $NaHCO_3$ = 25.8% $Na_2O$ × 620,000 TPY = 160,000 TPY
[3]Given Factors × $Na_2O$ Example: 2.45 × 160,000 = 392,000 TPY
[4]Case I: $CaCO_3$ = 6.2% × 620,000 TPY = 38,440 TPY
$CaSO_4$ = 1.360 × 38,440 TPY = 52,300 TPY
Factor: 0.062 × 1.360 = 0.0943 × 620,000 = 52,300 TPY
[5]Case I: $CaCO_3$ = 6.2% × 620,000 TPY = 38,440 TPY
$H_2SO_4$ = 38,440 TPY ÷ 1.02 = 37,700 TPY
Factor: 0.062/1.02 = 0.0608 × 620,000 TPY = 37,700 TPY
[6]Case I: $MgCO_3$
Factor: 0.028 (Assay)/0.857 = 0.0327 × 620,000 TPY = 20,300 TPY
[7]Case I:
$Na_2CO_3$ = 70% × 25% × 0.631 = 11.04%
= 11.04% × 620,000 TPY = 68,450 TPY
$H_2SO_4$ = 68,450 ÷ 1.081 = 63,300 TPY
Factor = 0.1104/1.081 = 0.1021 × 620,000 TPY =
= 63,300 TPY
[8]The tonnage of total acid consumed should be higher; a small error in calculations results when using factors with only a few significant figures.

The sulfur removed by the acid plant is calculated in terms of $H_2SO_4$ and is compared to the makeup acid requirements necessary in the $Fe^{115}$ [?] stripping operation 18:

| Case | H$_2$SO$_4$ Tons Produced By The Acid Plant | Fe$^{+2}$ Stripping Makeup Req'ts. | % Disposed From The Acid Plant |
|---|---|---|---|
| I | 664,700 TPY | 121,300 TPY | 18.2% |
| II | 569,700 TPY | 181,900 TPY | 31.9% |
| III | 474,800 TPY | 242,500 TPY | 51.1% |

To summarize, for Case i, wherein 20 percent of sulfur is removed from the smelter emissions by the Nahcolite scrubbing, the following results are obtained:
a. Annual nahcolite Ore requirements are 620,000 TPY;
b. 392,000 tons of FeSO$_4$ will be removed from the copper leaching circuit;
c. 994,700 TYP of solid SFH and Ca wastes are produced;
d. 18.2 percent of the acid plant production can be disposed-of.

For Case II, where the Nahcolite scrubbing removes 30 percent of sulfur in the emissions, the following occurs:
a. Annual Nahcolite Ore requirements are 930,000 TPY;
b. 588,000 TPY of FeSO$_4$ is removed from the leaching circuit by stripping;
c. 1,492,000 TPY of solid SFH and Ca wastes are produced;
d. 31.9 percent of the acid plant production can be disposed of in the Fe$^{+2}$ stripping operation.

For Case III, where 40 percent of sulfur emissions are removed by Nahcolite scrubbing, the following occurs:
a. Annual Nahcolite Ore requirements are 1,240,000 TPY;
b. 784,000 TPY of FeSO$_4$ is removed from the leaching circuit by stripping;
c. 1,989,300 TPY of solid SFH and Ca wastes are produced;
d. The acid plan can get rid of 51.1 percent of its production in the Fe$^{+2}$ stripping operations.

Conversely, where the instant process is assigned to remove 52,000 TPY of sulfur from a smelter using sodium (Nahcolite) scrubbing the yield is as follows:

Solid Waste = $Y_w$ = 16.041 $X_s$ = 16.441 (52,000) = 834,100 TPY
FeSO$_4$ Removed = $Y_f$ = 6.322 $X_s$ = 6.322 (52,000) = 270,400 TPY
H$_2$SO$_4$ Consumed = $Y_a$ = 1.956 $X_s$ = 1.956 (52,000) = 10,200 TPY It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A process for control of SO$_x$ off-gases from a copper smelter having copper ore in situ heap or dump leaching and cement copper operations requiring sulfuric acid-containing leach liquor, and said cement copper operation producing a barren, with respect to copper values, liquor rich in ferrous ions, comprising the steps of:
   a. contacting a smelter off-gas with a sodium alkali sorbent to form a sodium sulfur oxide salt waste,
   b. removing ferrous ions from said barren liquor by reacting said liquor with said sodium sulfur oxide salt waste,
   c. maintaining said reaction at a temperature in the range of from about 50° to 300° F and a pH below about 5.5 a time sufficient to form: (19 a substantially water insoluble double salt selected from natrojarosite, sideronatrite, metasideronatrite, depegite, rosarite, iriite and mixtures thereof, and (2) an iron-stripped leach liquor having reduced levels of ferrous iron and being substantially free of said sulfur oxide salt waste, and
   d. passing said iron-stripped leach liquor to said ore leaching operation for in situ leaching of copper values from said copper ore,
thereby controlling SO$_x$ emissions, disposing of water-soluble SO$_x$ emissions control wastes, and providing a leach liquor low in ferrous ion values which assists in reducing the amount of leach operation plugging contributed by leach liquor ferrous iron.

2. A process as in claim 1 wherein said pH is below about 3.5, said reaction time is from about 1 second to 7 days, and which includes the step of maintaining the reaction temperature below about 180° F.

3. A process as in claim 2 wherein ferrous ion in said barren liquor is converted to ferric ion by oxidation prior to said reaction with said sodium sulfur oxide control wastes.

4. A process as in claim 3 wherein said oxidation is in part biotic.

5. A process as in claim 1 wherein said sodium alkali is selected from sodium carbonate, sodium bicarbonate, sodium hydroxide, and mixtures thereof.

6. A process as in claim 5 wherein said sodium bicarbonate is Nahcolite and said step of contacting comprises a dry sorption process producing a dry waste comprising sodium sulfate, sodium sulfite, and mixtures thereof.

7. A process as in claim 1 wherein said reaction occurs in a plurality of zones.

8. A process as in claim 1 wherein a portion of said smelter off-gases are converted to sulfuric acid, and a portion of said acid is supplied to said reaction to assist in maintaining said pH.

9. A process as in claim 1 wherein said alkali sorbent is sodium carbonate, and said contacting step includes wet scrubbing.

10. A process as in claim 1 wherein said sodium sulfur oxide waste includes sodium sulfite, and which includes the step of oxidizing said sulfite to sulfate.

* * * * *